United States Patent
Takashima

(10) Patent No.: US 9,706,167 B2
(45) Date of Patent: Jul. 11, 2017

(54) TRANSMISSION SYSTEM, TRANSMISSION MANAGEMENT SYSTEM, AND TRANSMISSION METHOD

(71) Applicant: Naoki Takashima, Kanagawa (JP)

(72) Inventor: Naoki Takashima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 122 days.

(21) Appl. No.: 14/854,398

(22) Filed: Sep. 15, 2015

(65) Prior Publication Data

US 2016/0081167 A1   Mar. 17, 2016

(30) Foreign Application Priority Data

Sep. 17, 2014   (JP) ................................. 2014-189445

(51) Int. Cl.
| | | |
|---|---|---|
| H05B 37/02 | (2006.01) | |
| H04N 7/15 | (2006.01) | |
| H04L 12/18 | (2006.01) | |
| H04L 29/06 | (2006.01) | |

(52) U.S. Cl.
CPC ........... *H04N 7/15* (2013.01); *H04L 12/1827* (2013.01); *H04L 65/1069* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 7,103,806 B1 * | 9/2006 | Horvitz | .................. H04L 69/24 709/220 |
| 8,861,377 B2 | 10/2014 | Okuyama et al. | |
| 9,043,399 B2 | 5/2015 | Umehara | |
| 9,332,220 B2 * | 5/2016 | Akimoto | ................ H04N 7/147 |
| 9,348,396 B2 * | 5/2016 | Higuchi | ................ G06F 1/3206 |

(Continued)

FOREIGN PATENT DOCUMENTS

| | | |
|---|---|---|
| JP | 2013-206024 | 10/2013 |
| JP | 2016-9336 A | 1/2016 |

*Primary Examiner* — Crystal L Hammond
(74) *Attorney, Agent, or Firm* — Oblon, McClelland, Maier & Neustadt, L.L.P.

(57) ABSTRACT

A system comprises: a state-detecting unit detecting whether a lighting apparatus in a specific area is turned on from an off-state; a first-identifying unit identifying a first transmission terminal serving as one of the transmission terminals belonging to the area when it is detected that the lighting apparatus is turned on; a second-identifying unit identifying a second transmission terminal serving as one or more of the transmission terminals set to perform a simultaneous operation with the first transmission terminal; a transmitting unit transmitting a first start instruction to the first transmission terminal identified by the first-identifying unit and transmits a second start instruction to the second transmission terminal identified by the second-identifying unit; a first-power-management unit performing start processing on the first transmission terminal in accordance with the first start instruction; and a second-power-management unit performing start processing on the second transmission terminal in accordance with the second start instruction.

17 Claims, 15 Drawing Sheets

(56) References Cited

U.S. PATENT DOCUMENTS

| | | | |
|---|---|---|---|
| 2005/0057542 A1* | 3/2005 | Plut | H04N 9/3141 345/204 |
| 2009/0006571 A1* | 1/2009 | Muto | H04L 12/24 709/206 |
| 2010/0192548 A1* | 8/2010 | Irlbeck | F01N 3/027 60/287 |
| 2013/0234893 A1* | 9/2013 | Kusakari | G01S 1/08 342/386 |
| 2013/0342399 A1* | 12/2013 | Fukuda | G01S 1/02 342/386 |
| 2014/0091731 A1* | 4/2014 | Fushimi | H05B 37/0245 315/292 |
| 2014/0129641 A1 | 5/2014 | Umehara | |
| 2014/0267566 A1* | 9/2014 | Hamada | H04N 7/15 348/14.08 |
| 2014/0362741 A1 | 12/2014 | Okuyama et al. | |
| 2015/0077510 A1* | 3/2015 | Hamada | H04L 12/1818 348/14.09 |
| 2016/0127686 A1* | 5/2016 | Nagase | H04N 7/15 348/14.07 |

* cited by examiner

FIG.5

AUTHENTICATION MANAGEMENT TABLE

| ID | PASSWORD |
|---|---|
| 80aa | aaaa |
| 80ab | abab |
| 80ba | baba |
| ⋮ | ⋮ |

FIG.6

AUTOMATIC OPERATION SETTING MANAGEMENT TABLE

| AUTOMATIC START SETTING (ON=1) | AUTOMATIC SHUTDOWN SETTING (ON=1) |
|---|---|
| 1 | 1 |

FIG.7

MESSAGE MANAGEMENT TABLE

| MESSAGE ID | MESSAGE |
|---|---|
| 0 | BECAUSE LIGHTING APPARATUSES ON THE FLOOR AT THE XX BASE ARE TURNED OFF, THE TELECONFERENCE WILL BE CUT OFF, AND THE APPARATUS WILL AUTOMATICALLY SHUT DOWN IN X SECONDS<br><br>[CANCEL] |
| 1 | BECAUSE ALL LIGHTING APPARATUSES ON THE FLOOR ARE TURNED OFF, THE APPARATUS WILL AUTOMATICALLY SHUT DOWN BY AUTOMATIC OPERATION SETTING |
| 2 | THE APPARATUS HAS AUTOMATICALLY STARTED BY AUTOMATIC OPERATION SETTING<br><br>[OK] |

FIG.8

LIGHTING MANAGEMENT TABLE

| FLOOR | AREA A | AREA B | AREA C | AREA D |
|---|---|---|---|---|
| 1F | 1 | 0 | 1 | 1 |
| 2F | 0 | 0 | 0 | 0 |
| 3F | 1 | 0 | 0 | 0 |
| 4F | 1 | 1 | 1 | 1 |
| 5F | 1 | 1 | 1 | 0 |

FIG. 9

TERMINAL MANAGEMENT TABLE

| ADMINISTRATOR SETTING | IP ADDRESS | TERMINAL ID | TERMINAL NAME | FLOOR | TYPE | OPERATION FLAG | AUTOMATIC START SETTING (ON=1) | AUTOMATIC SHUTDOWN SETTING (ON=1) |
|---|---|---|---|---|---|---|---|---|
| 1 | 192.168.1.0/24 | - | - | 1F | - | - | - | - |
| - | 192.168.1.8/30 | - | - | 1F | LMS | 1 | - | - |
| - | 192.168.1.20 | TV1a | TOKYO OFFICE TV1A TERMINAL | 1F | TVCA | 1 | 1 | 1 |
| - | 192.168.1.30 | MF1a | TOKYO OFFICE MF1A TERMINAL | 1F | MFP | 1 | 1 | 1 |
| - | 192.168.1.40 | TV1b | TOKYO OFFICE TV1B TERMINAL | 1F | TVCA | 1 | 0 | 0 |
| - | 192.168.1.50 | PJ1a | TOKYO OFFICE PJ1A TERMINAL | 1F | PJ | 1 | 0 | 0 |
| 1 | 192.168.2.0/24 | - | - | 2F | - | - | - | - |
| - | 192.168.2.8/30 | - | - | 2F | LMS | 1 | - | - |
| - | 192.168.2.20 | TV2a | TOKYO OFFICE TV2A TERMINAL | 2F | TVCA | 1 | 0 | 1 |
| - | 192.168.2.30 | TV2b | TOKYO OFFICE TV2B TERMINAL | 2F | TVCA | 1 | 1 | 1 |
| - | 192.168.2.40 | TP2a | TOKYO OFFICE TP2A TERMINAL | 2F | TPWB | 1 | 0 | 0 |
| - | 192.168.2.50 | TV2c | TOKYO OFFICE TV2C TERMINAL | 2F | TVCA | 1 | 1 | 0 |
| ... | ... | ... | ... | ... | ... | ... | ... | ... |

FIG.10

DESTINATION LIST MANAGEMENT TABLE

| REQUEST SOURCE TERMINAL ID | DESTINATION TERMINAL ID |
|---|---|
| TV1a[*2][*1] | TV2a[*1], TVF3a, TVF4b[*2], TVK1c |
| TV2b | TV1b, TV3c, TVF1d[*3] |
| TVF1a | TV1a[*1], TVK2f |
| ... | ... |
| TVK1a | TV1b, TVF1k[*3], TVK3d, TVK4a |

FIG.11

| IP ADDRESS | FLOOR |
|---|---|
| 192.168.1.0/24 | 1F |
| 192.168.2.0/24 | 2F |
| 192.168.3.0/24 | 3F |
| 192.168.4.0/24 | 4F |
| 192.168.5.0/24 | 5F |

| FLOOR | AREA A | AREA B | AREA C | AREA D |
|---|---|---|---|---|
| 1F | | | | |
| 2F | | | | |
| 3F | | | | |
| 4F | | | | |
| 5F | | | | |

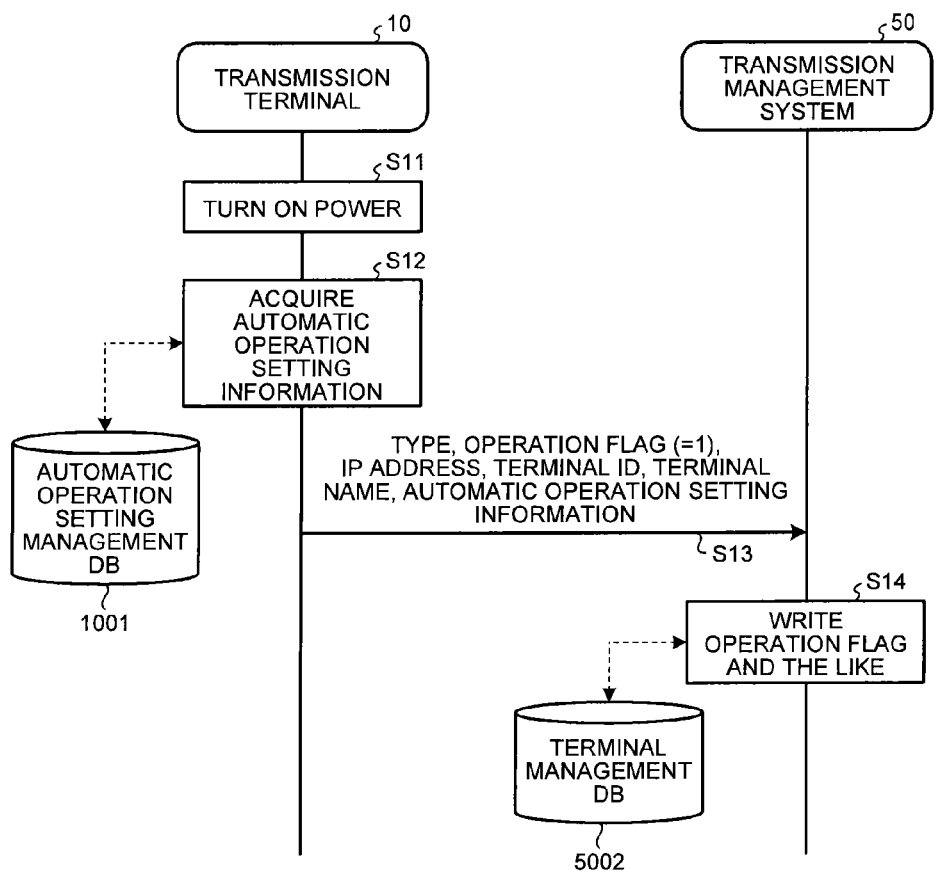

THE APPARATUS HAS AUTOMATICALLY STARTED BY
AUTOMATIC OPERATION SETTING

BECAUSE ALL LIGHTING APPARATUSES ON THE FLOOR ARE TURNED OFF, THE APPARATUS WILL AUTOMATICALLY SHUT DOWN BY AUTOMATIC OPERATION SETTING

TRANSMISSION SYSTEM, TRANSMISSION MANAGEMENT SYSTEM, AND TRANSMISSION METHOD

CROSS-REFERENCE TO RELATED APPLICATIONS

The present application claims priority to and incorporates by reference the entire contents of Japanese Patent Application No. 2014-189445 filed in Japan on Sep. 17, 2014.

BACKGROUND OF THE INVENTION

1. Field of the Invention

The present invention relates to a transmission system, a transmission management system, and a transmission method.

2. Description of the Related Art

Recently widely used are transmission systems in which various apparatuses are connected via a communication network, such as the Internet, to perform information communications with one another. Transmission terminals, such as teleconferencing apparatuses, lighting equipment, multi-function peripherals (MFPs), and projectors, are connected to a communication network to perform information communications with one another. Especially widely used are teleconference systems that conduct a teleconference in which a plurality of teleconferencing apparatuses serving as transmission terminals can transmit and receive image data and audio data via a communication network.

There have been developed various transmission systems, including a system that uses a reservation schedule of a conference room and grasps the state of a user's entering or leaving the room space, thereby effectively controlling apparatuses (refer to Japanese Patent Application Laid-open No. 2013-206024).

In view of the conventional art described above, there is a need to improve the convenience for a user of an apparatus.

SUMMARY OF THE INVENTION

It is an object of the present invention to at least partially solve the problems in the conventional technology.

According to the present invention, there is provided a transmission system including a plurality of transmission terminals, the transmission system comprising: a state detecting unit that detects whether a lighting apparatus in a specific area is turned on from an off-state; a first identifying unit that identifies a first transmission terminal serving as one of the transmission terminals belonging to the area when the state detecting unit detects that the lighting apparatus is turned on from an off-state; a second identifying unit that identifies a second transmission terminal serving as one or more of the transmission terminals set to perform a simultaneous operation with the first transmission terminal; a transmitting unit that transmits a first start instruction to the first transmission terminal identified by the first identifying unit and transmits a second start instruction to the second transmission terminal identified by the second identifying unit; a first power management unit that performs start processing on the first transmission terminal in accordance with the first start instruction; and a second power management unit that performs start processing on the second transmission terminal in accordance with the second start instruction.

The present invention also provides a transmission management system comprising: a first identifying unit that identifies, when a lighting management system detects that a lighting apparatus in an area managed by the lighting management system is turned on from an off-state, a first transmission terminal serving as a transmission terminal belonging to the area; a second identifying unit that identifies a second transmission terminal serving as one or more of transmission terminals set to perform a simultaneous operation with the first transmission terminal; and a transmitting unit that transmits a first start instruction for performing start processing to the first transmission terminal identified by the first identifying unit and transmits a second start instruction for performing start processing to the second transmission terminal identified by the second identifying unit.

The present invention also provides a transmission method performed by a transmission system including a plurality of transmission terminals, the transmission method comprising: a state-detecting that detects whether a lighting apparatus in a specific area is turned on from an off-state; a first-identifying that identifies a first transmission terminal serving as one of the transmission terminals belonging to the area when it is detected that the lighting apparatus is turned on from the off-state; a second-identifying that identifies a second transmission terminal serving as one or more of the transmission terminals set to perform a simultaneous operation with the first transmission terminal; a transmitting that transmits a first start instruction to the identified first transmission terminal and transmits a second start instruction to the identified second transmission terminal; a first-performing that performs start processing on the first transmission terminal in accordance with the first start instruction; and a second-performing that performs start processing on the second transmission terminal in accordance with the second start instruction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a conceptual diagram of an authentication management table;

FIG. 6 is a conceptual diagram of an automatic operation setting management table;

FIG. 7 is a conceptual diagram of a message management table;

FIG. 8 is a conceptual diagram of a lighting management table;

FIG. 9 is a conceptual diagram of a terminal management table;

FIG. 10 is a conceptual diagram of a destination list management table;

FIG. 11 is a diagram of an example of setting of network information;

FIG. 15 is a sequence diagram of an example of operations performed by a transmission terminal at start-up;

FIG. 16 is a diagram of an example of the contents of information transmitted by the transmission terminal;

FIG. 18 is a diagram of an example of a message display screen that displays a message when the transmission terminal automatically starts;

FIG. 20 is a diagram of an example of the message display screen that displays a message when the transmission terminal automatically shuts down.

DETAILED DESCRIPTION OF THE PREFERRED EMBODIMENTS

Exemplary embodiments of a transmission system, a transmission management system, and a transmission method according to the present invention are described below in greater detail with reference to FIGS. 1 to 20. The embodiments below are not intended to limit the present invention. Components according to the embodiments include components easily conceivable by those skilled in the art, components substantially identical thereto, and what is called equivalents. Furthermore, various omissions, substitutions, changes, and combinations of the components may be made without departing from the spirit of the invention.

Entire Configuration of an Embodiment of the Present Invention

Figure 1:
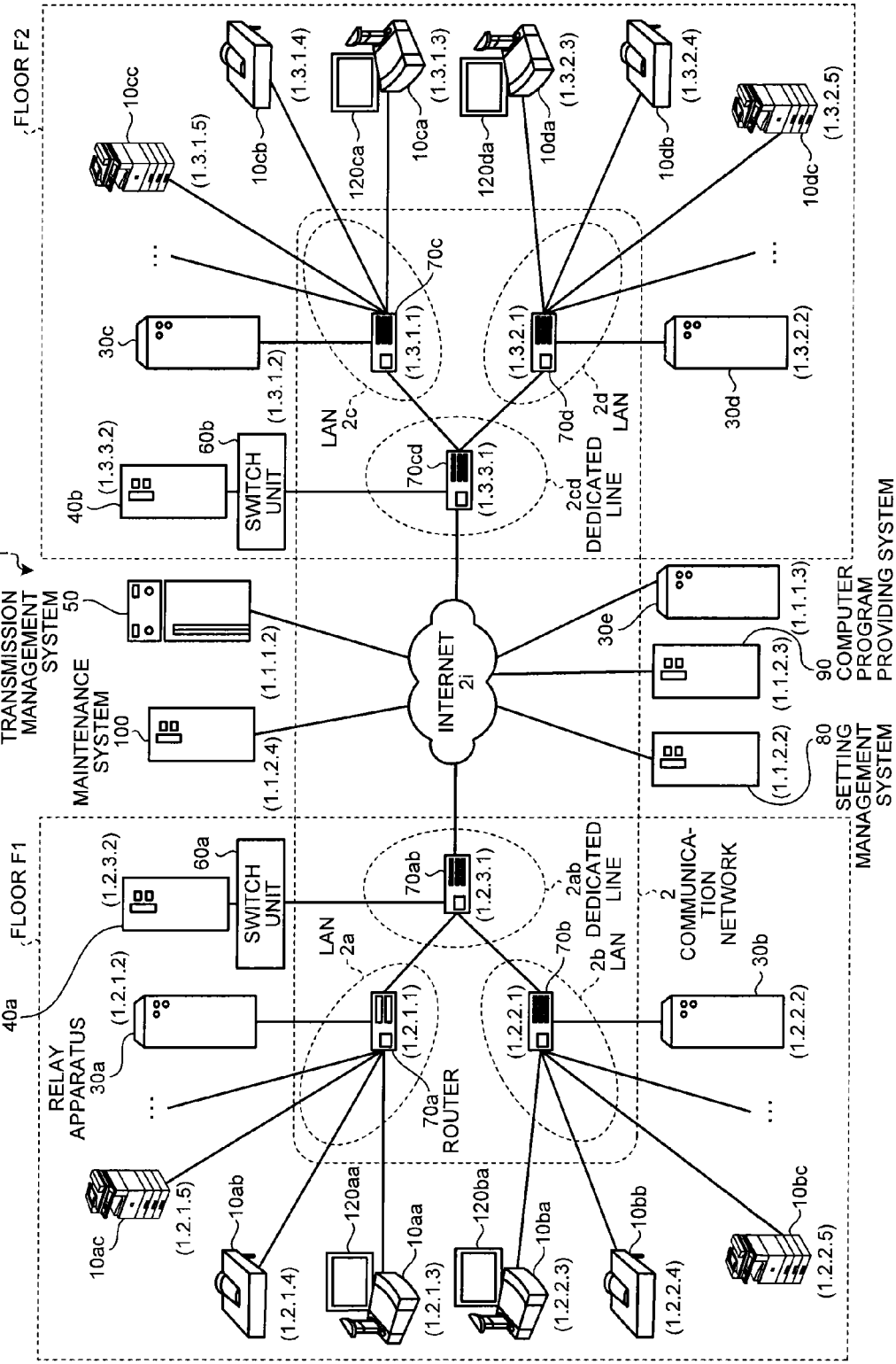
FIG. 1 is a schematic of an exemplary entire configuration of a transmission system according to an embodiment of the present invention.

FIG. 1 is a schematic of an exemplary entire configuration of a transmission system according to an embodiment of the present invention. The following describes the outline of the entire configuration of a transmission system 1 with reference to FIG. 1.

As illustrated in FIG. 1, the transmission system 1 includes a plurality of transmission terminals (10aa, 10ab, . . . ), a plurality of relay apparatuses (30a to 30e), a plurality of lighting management systems (40a and 40b), a transmission management system 50, switching units (60a and 60b), a setting management system 80, a computer program providing system 90, and a maintenance system 100.

As illustrated in FIG. 1, the transmission terminals according to the present embodiment are teleconferencing apparatuses 10aa, 10ba, 10ca, and 10da, projectors 10ab, 10bb, 10cb, and 10db, and MFPs 10ac, 10bc, 10cc, and 10dc. To specify a certain terminal of the transmission terminals or collectively call the transmission terminals, they are simply referred to as a "transmission terminal 10". To specify a certain apparatus of the relay apparatuses 30a to 30e or collectively call the relay apparatuses 30a to 30e, they are simply referred to as a "relay apparatus 30". To specify a certain system of the lighting management systems 40a and 40b or collectively call the lighting management systems 40a and 40b, they are simply referred to as a "lighting management system 40". To specify a certain switch unit of the switch units 60a and 60b or collectively call the switch units 60a and 60b, they are simply referred to as a "switch unit 60".

The transmission terminal 10 transmits and receives various types of information to and from other apparatuses. The teleconferencing apparatuses 10aa, 10ba, 10ca, and 10da serving as the transmission terminal 10 establish a session with other teleconferencing apparatuses to carry out a conversation in the established session by transmitting and receiving content data including audio data and image data. Thus, the transmission system 1 conducts a teleconference among the teleconferencing apparatuses. The projectors 10ab, 10bb, 10cb, and 10db serving as the transmission terminal 10 project and display an image or video on a screen, for example. The MFPs 10ac, 10bc, 10cc, and 10dc serving as the transmission terminal 10 has at least two functions out of a copier function, a printer function, a scanner function, and a facsimile function. While FIG. 1 illustrates the teleconferencing apparatuses, the projectors, and the MFPs as the transmission terminal 10, they are given by way of example only, and the transmission terminal 10 is not limited thereto. In the following description, the transmission terminal 10 is a teleconferencing apparatus.

The transmission terminal 10 performs an automatic start operation or an automatic shutdown operation in response to an instruction from the transmission management system 50. The automatic start operation and the automatic shutdown operation performed by the transmission terminal 10 will be described later. A shutdown means causing a computer (transmission terminal 10 in this example) to stop, including completely turning off the power, causing the computer to sleep, and causing the computer to be suspended, for example.

The relay apparatus 30 relays content data among the teleconferencing apparatuses serving as the transmission terminals 10.

The lighting management system 40 is a computer placed on each floor (floors F1 and F2 in the example in FIG. 1) and collectively manages the lighting state of lighting apparatuses on the floor. While the lighting management system 40 is placed on each floor, the embodiment is not limited thereto. In a case where a floor is divided into a plurality of areas, for example, the lighting management system 40 may be placed in each area.

The transmission management system 50 is a computer that collectively manages the transmission terminals 10. The transmission management system 50 controls the transmission terminals 10 based on the lighting state of the lighting apparatuses on each floor received from the lighting management system 40. When receiving, from the lighting management system 40, a state in which a lighting apparatus on a floor is turned on, for example, the transmission management system 50 transmits a start instruction to the transmission terminal 10 placed on the floor and set to automatically start, which will be described later. By contrast, when receiving, from the lighting management system 40, a state in which all the lighting apparatuses on a floor are turned off, the transmission management system 50 transmits a shutdown instruction (stop instruction) to the transmission terminal 10 placed on the floor and set to automatically shut down, which will be described later. The start instruction is an instruction for turning on the power of a target apparatus and causing the apparatus to perform start processing. The start instruction is a signal using the Wake-on-LAN, for example. The transmission of the start instruction and the shutdown instruction performed by the transmission management system 50 will be described later.

The switch unit 60 is a network device, such as a switching hub, that connects the lighting management system 40 to a lighting control unit (refer to FIG. 4), which is not illustrated in FIG. 1, for a lighting apparatus managed by the lighting management system 40. The switch unit 60 relays lighting state information on the lighting apparatus from the lighting control unit to the lighting management system 40.

A plurality of routers 70a to 70d, 70ab, and 70cd illustrated in FIG. 1 are network devices that select the optimum path for communication data. To specify a certain router of the routers 70a to 70d, 70ab, and 70cd according to the present embodiment or collectively call the routers 70a to 70d, 70ab, and 70cd, they are simply referred to as a "router 70".

The setting management system 80 is a computer that logs in to the transmission terminal 10, the lighting management system 40, or the transmission management system 50 to set automatic setting information, area information, network information, and a simultaneous operation, which will be described later.

The computer program providing system 90 includes an external storage device (e.g., a hard disk drive (HDD)), which is not illustrated, that stores therein a terminal program for providing various functions or various units to the transmission terminal 10. The computer program providing system 90 is a computer that provides the terminal program to the transmission terminal 10. The computer program providing system 90 also stores computer programs for providing various functions or various units to the relay apparatus 30, the lighting management system 40, the transmission management system 50, and the setting management system 80 in the external storage device. The computer program providing system 90 transmits the respective computer programs to the relay apparatus 30, the lighting management system 40, the transmission management system 50, and the setting management system 80.

The maintenance system 100 is a computer that supports, manages, or maintains at least one of the transmission terminal 10, the relay apparatus 30, the lighting management system 40, the transmission management system 50, the setting management system 80, and the computer program providing system 90. Let us assume that the maintenance system 100 is placed in a country and that the transmission terminal 10, the relay apparatus 30, the lighting management system 40, the transmission management system 50, the setting management system 80, or the computer program providing system 90 is placed outside the country, for example. In this case, the maintenance system 100 remotely performs a maintenance operation, such as support, management, and maintenance, on at least one of the transmission terminal 10, the relay apparatus 30, the lighting management system 40, the transmission management system 50, the setting management system 80, and the computer program providing system 90 via a communication network 2. The maintenance system 100 also performs a maintenance operation, such as management of a model number, a serial number, a sale destination, and a history of a maintenance inspection or a failure, on at least one of the transmission terminal 10, the relay apparatus 30, the lighting management system 40, the transmission management system 50, the setting management system 80, and the computer program providing system 90 without using the communication network 2.

The transmission terminals 10 (10aa, 10ab, 10ac, . . . ), the relay apparatus 30a, and the router 70a are communicably connected via a local area network (LAN) 2a. The transmission terminals 10 (10ba, 10bb, 10bc, . . . ), the relay apparatus 30b, and the router 70b are communicably connected via a LAN 2b. The LAN 2a, the LAN 2b, the switch unit 60a, and the router 70ab are communicably connected via a dedicated line 2ab and are provided on the floor F1. In FIG. 1, the floor F1 is a specific floor in a certain building, for example, and the LAN 2a and the LAN 2b are established on the same floor.

The transmission terminals 10 (10ca, 10cb, 10cc, . . . ), the relay apparatus 30c, and the router 70c are communicably connected via a LAN 2c. The transmission terminals 10 (10da, 10db, 10dc, . . . ), the relay apparatus 30d, and the router 70d are communicably connected via a LAN 2d. The LAN 2c, the LAN 2d, the switch unit 60b, and the router 70cd are communicably connected via a dedicated line 2cd and are provided on the floor F2. In FIG. 1, the floor F2 is a floor different from the floor F1 in the certain building, for example, and the LAN 2c and the LAN 2d are established on the same floor.

The networks on the floors F1 and F2 are communicably connected via the Internet 2i with the routers 70ab and 70cd, respectively.

The transmission management system 50, the setting management system 80, the computer program providing system 90, and the maintenance system 100 are communicably connected to the transmission terminals 10 and the relay apparatuses 30 via the Internet 2i. The transmission management system 50, the setting management system 80, the computer program providing system 90, and the maintenance system 100 may be placed on the floor F1 or the floor F2 or in another region.

The relay apparatus 30e is communicably connected to the transmission terminals 10 via the communication network 2. The relay apparatus 30e always operates and is placed in a region other than the floors F1 and F2 so as to be less affected by an influence of communication traffic in the local area on the floor F1 or the floor F2. To carry out a conversation between a teleconferencing apparatus serving as the transmission terminal 10 and a teleconferencing apparatus placed in another local area, the relay apparatus 30e is used as a relay apparatus to relay content data. Furthermore, to carry out a conversation between teleconferencing apparatuses in a single local area, the relay apparatus 30e is used as an emergency relay apparatus when a relay apparatus placed in the local area is not operating.

The communication network 2 according to the present embodiment includes the LAN 2a, the LAN 2b, the dedicated line 2ab, the Internet 2i, the dedicated line 2cd, the LAN 2c, and the LAN 2d. The communication network 2 may partially perform wireless communications besides wired communications.

Four-digit figures provided near the respective transmission terminals 10, the respective relay apparatuses 30, the respective lighting management systems 40, the transmission management system 50, the respective routers 70, the setting management system 80, the computer program providing system 90, and the maintenance system 100 in FIG. 1 simply indicate Internet Protocol (IP) addresses according to the generally used IPv4. The IP address of the teleconferencing apparatus 10aa is "1.2.1.3", for example. While the transmission system 1 may employ the IPv6 instead of the IPv4, the present embodiment employs the IPv4 for simplification of the explanation.

The configuration of the transmission system 1 illustrated in FIG. 1 is given by way of example only, and the embodiment is not limited thereto. In other words, the numbers of the apparatuses, the systems, the switch units in FIG. 1 are not limited to those illustrated in FIG. 1. While FIG. 1 illustrates the network configuration on the two floors F1 and F2, the number of the floors may be one or three or more. The floors are not necessarily included in a single building and may be included in different buildings.

Hardware Configuration According to the Present Embodiment

The following describes the hardware configuration of the apparatuses according to the present embodiment.

Hardware Configuration of the Transmission Terminal

Figure 2:
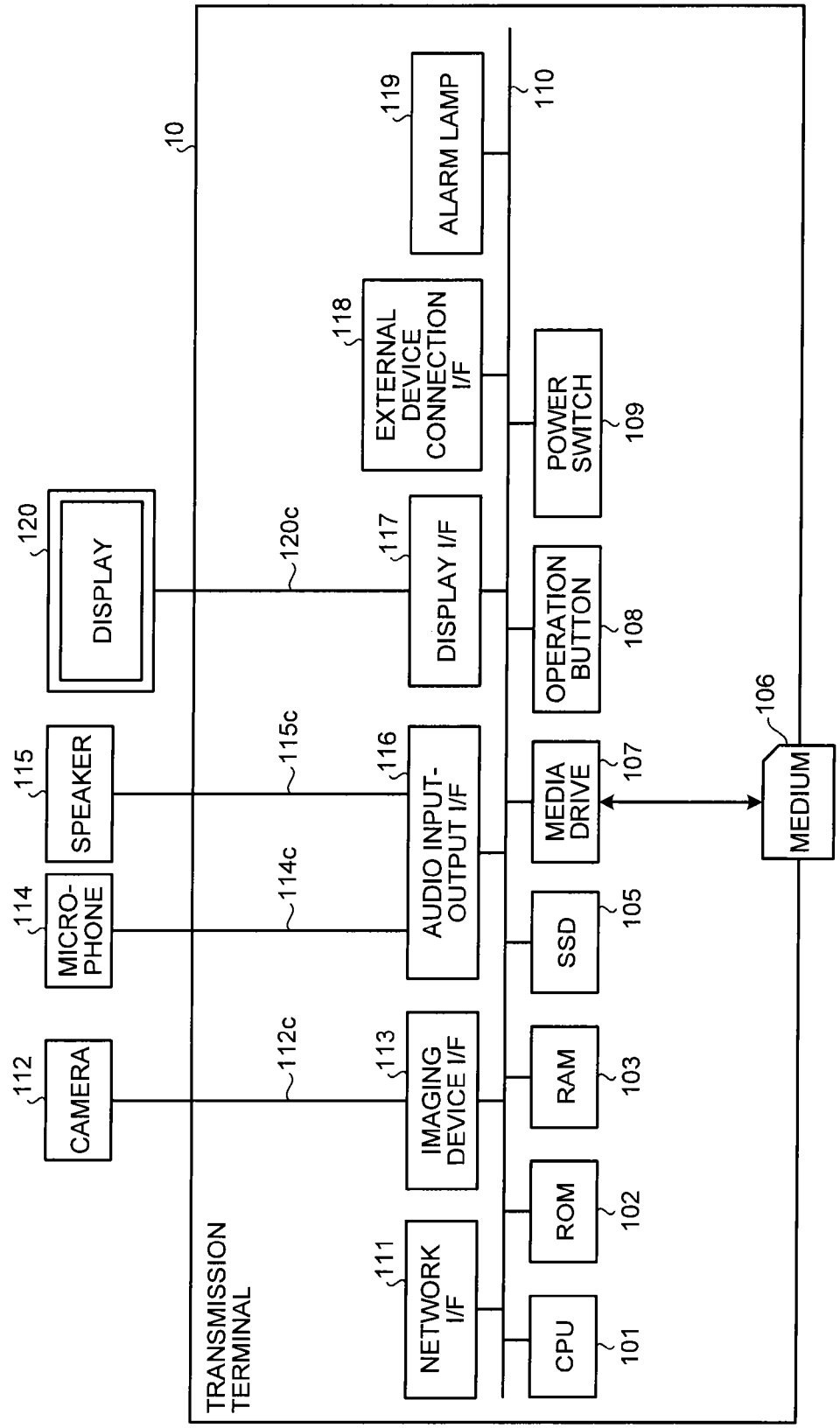
FIG. 2 is a diagram of an exemplary hardware configuration of a transmission terminal.

FIG. 2 is a diagram of an exemplary hardware configuration of the transmission terminal. The following describes the hardware configuration of the transmission terminal 10 in greater detail with reference to FIG. 2. In FIG. 2, the transmission terminal 10 corresponds to a teleconferencing apparatus as described above.

As illustrated in FIG. 2, the transmission terminal 10 according to the present embodiment includes a central processing unit (CPU) 101, a read only memory (ROM) 102, a random access memory (RAM) 103, a solid state drive (SSD) 105, a media drive 107, an operation button 108, and a power switch 109.

The CPU 101 is a device that collectively controls the operations of the transmission terminal 10. The ROM 102 is a non-volatile storage device that stores therein a computer program for the transmission terminal 10. The RAM 103 is a volatile storage device used as a work area for the CPU 101. The SSD 105 is an external storage device that stores therein various data, such as image data, audio data, print data, and video data. The SSD 105 is given by way of example only, and the external storage device may be an HDD, for example. The media drive 107 is a device that controls reading and writing of data from and to a medium 106, such as a flash memory, under the control of the CPU 101. The operation button 108 is operated to instruct the transmission terminal 10 to perform an operation, for example. The power switch 109 switches on and off the power of the transmission terminal 10.

The transmission terminal 10 further includes a network interface (I/F) 111, an imaging device I/F 113, an audio input-output I/F 116, a display I/F 117, an external device connection I/F 118, and an alarm lamp 119.

The network I/F 111 transmits and receives data using the communication network 2. The imaging device I/F 113 receives image data from a camera 112 that obtains the image data by capturing a subject under the control of the CPU 101. The audio input-output I/F 116 inputs audio signals from a microphone 114 that inputs audio and outputs audio signals to a speaker 115 that outputs audio under the control of the CPU 101. The microphone 114 and the speaker 115 are connected to the audio input-output I/F 116 via a cable 114c and a cable 115c, respectively. The display I/F 117 transmits image data to an external display 120 under the control of the CPU 101. The external device connection I/F 118 is used to connect various external devices. The alarm lamp 119 notifies a user of abnormality in the various functions of the transmission terminal 10.

The CPU 101, the ROM 102, the RAM 103, the SSD 105, the media drive 107, the operation button 108, the power switch 109, the network I/F 111, the imaging device I/F 113, the audio input-output I/F 116, the display I/F 117, the external device connection I/F 118, and the alarm lamp 119 are communicably connected to one another via a bus line 110, such as an address bus and a data bus.

The medium 106 is a storage device attachable to and detachable from the transmission terminal 10. The medium 106 is not limited to a flash memory and may be any non-volatile memory from and to which data is read and written under the control of the CPU 101. The medium 106 may be an electrically erasable and programmable ROM (EEPROM), for example.

The camera 112 includes a lens and a solid-state imaging device that converts light into electric charges, thereby computerizing an image (video) of the subject. The camera 112 is connected to the imaging device I/F 113 via a cable 112c. The solid-state imaging device is a complementary metal-oxide semiconductor (CMOS) or a charge coupled device (CCD), for example.

The external device connection I/F 118 is an interface to which an external device, such as an external camera, an external microphone, and an external speaker, can be electrically connected via a universal serial bus (USB) cable, for example. When an external camera is connected to the external device connection I/F 118, the external camera is driven in priority to the camera 112 under the control of the CPU 101. When an external microphone is connected to the external device connection I/F 118, the external microphone is driven in priority to the microphone 114 under the control of the CPU 101. When an external speaker is connected to the external device connection I/F 118, the external speaker is driven in priority to the speaker 115 under the control of the CPU 101.

The display 120 is a liquid-crystal or organic electroluminescence (EL) display device that displays an image of the subject and an operation icon, for example. The display 120 is connected to the display I/F 117 via a cable 120c. The display 120 corresponds to displays 120aa, 120ba, 120ca, and 120da connected to the teleconferencing apparatuses 10aa, 10ba, 10ca, and 10da, respectively, in FIG. 1. The cable 120c may be an analog RGB (VGA) signal cable, a component video cable, a high-definition multimedia interface (HDMI) (registered trademark) signal cable, or a digital video interactive (DVI) signal cable.

The computer program for the transmission terminal 10 may be recorded and distributed in a computer-readable recording medium (e.g., the medium 106) as an installable or executable file. Alternatively, the computer program for the transmission terminal 10 may be stored not in the medium 106 but in the ROM 102.

Hardware Configuration of the Relay Apparatus and the Various Systems

Figure 3:
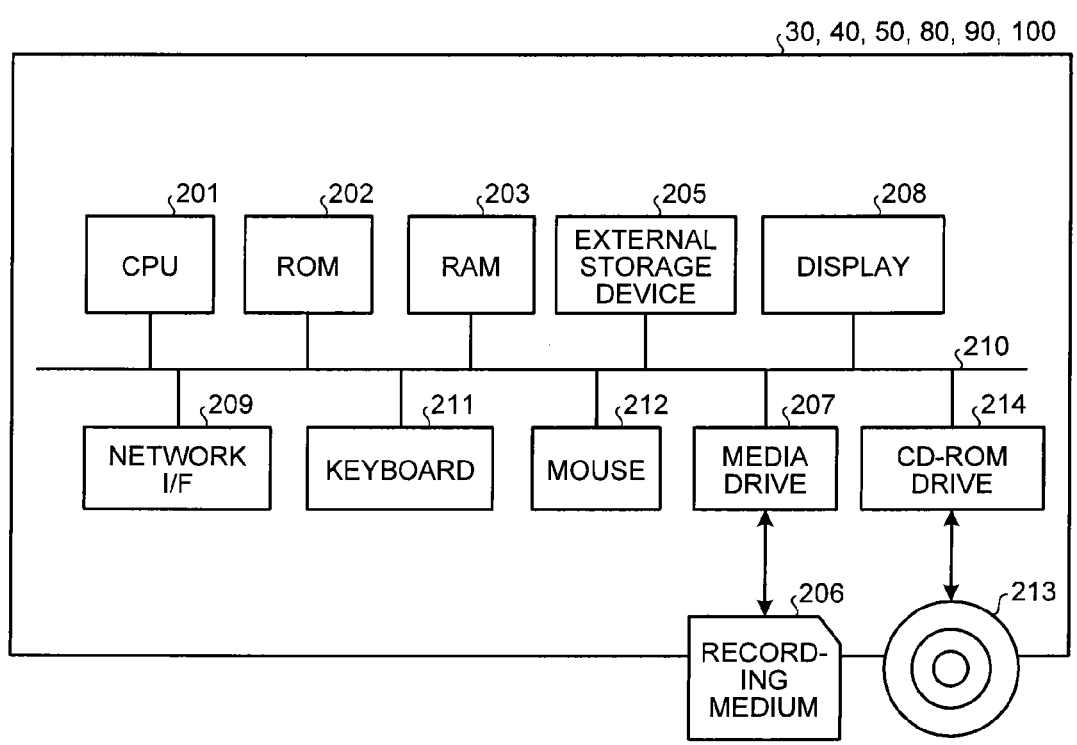
FIG. 3 is a diagram of an exemplary hardware configuration of a relay apparatus, a lighting management system, a transmission management system, a setting management system, a computer program providing system, and a maintenance system.

FIG. 3 is a diagram of an exemplary hardware configuration of the relay apparatus, the lighting management system, the transmission management system, the setting management system, the computer program providing system, and the maintenance system. The following describes the hardware configuration of the relay apparatus 30, the lighting management system 40, the transmission management system 50, the setting management system 80, the computer program providing system 90, and the maintenance system 100 in greater detail with reference to FIG. 3.

The hardware configuration of the transmission management system 50 will be described with reference to FIG. 3. As illustrated in FIG. 3, the transmission management system 50 includes a CPU 201, a ROM 202, a RAM 203, an external storage device 205, a media drive 207, a display 208, a network I/F 209, a keyboard 211, a mouse 212, and a compact disc read only memory (CD-ROM) drive 214.

The CPU 201 is a device that collectively controls the operations of the transmission management system 50. The ROM 202 is a non-volatile storage device that stores therein a computer program for the transmission management system 50. The RAM 203 is a volatile storage device used as a work area for the CPU 201. The external storage device 205 is a storage device, such as an HDD and an SSD, that stores therein various data including an authentication management database (DB) 5001, a terminal management DB 5002, and a destination list management DB 5003, which will be described later. The media drive 207 is a device that controls reading and writing of data from and to a recording medium 206, such as a flash memory, under the control of the CPU 201. The display 208 is a display device that displays various types of information, such as a cursor, a menu, a window, a character, and an image. The network I/F 209 transmits and receives data using the communication network 2. The keyboard 211 is an input device used to select a character, a figure, and various instructions, and move the cursor, for example. The mouse 212 is an input device used to select and execute various instructions, select an object to be processed, and move the cursor, for example. The CD-ROM drive 214 is a device that controls reading and writing of data from and to a CD-ROM 213 serving as an example of a detachable storage medium.

The CPU 201, the ROM 202, the RAM 203, the external storage device 205, the media drive 207, the display 208, the network I/F 209, the keyboard 211, the mouse 212, and the CD-ROM drive 214 are communicably connected to one another via a bus line 210, such as an address bus and a data bus.

The computer program for the transmission management system 50 may be recorded and distributed in a computer-readable recording medium, such as the recording medium 206 and the CD-ROM 213, as an installable or executable file.

Because the relay apparatus 30 has the same hardware configuration as that of the transmission management system 50, the explanation thereof will be omitted. The ROM 202, however, stores therein a computer program for the relay apparatus 30 for controlling the relay apparatus 30. The computer program for the relay apparatus may also be recorded and distributed in a computer-readable recording medium, such as the recording medium 206 and the CD-ROM 213, as an installable or executable file.

Because the lighting management system 40 has the same hardware configuration as that of the transmission management system 50, the explanation thereof will be omitted. The ROM 202, however, stores therein a computer program for the lighting management system 40 for controlling the lighting management system 40. The computer program for the lighting management system 40 may also be recorded and distributed in a computer-readable recording medium, such as the recording medium 206 and the CD-ROM 213, as an installable or executable file.

Because the setting management system 80 has the same hardware configuration as that of the transmission management system 50, the explanation thereof will be omitted. The ROM 202, however, stores therein a computer program for the setting management system 80 for controlling the setting management system 80. The computer program for the setting management system 80 may also be recorded and distributed in a computer-readable recording medium, such as the recording medium 206 and the CD-ROM 213, as an installable or executable file.

Because the computer program providing system 90 has the same hardware configuration as that of the transmission management system 50, the explanation thereof will be omitted. The ROM 202, however, stores therein a computer program for the computer program providing system 90 for controlling the computer program providing system 90. The computer program for the computer program providing system 90 may also be recorded and distributed in a computer-readable recording medium, such as the recording medium 206 and the CD-ROM 213, as an installable or executable file.

Because the maintenance system 100 has the same hardware configuration as that of the transmission management system 50, the explanation thereof will be omitted. The ROM 202, however, stores therein a computer program for the maintenance system 100 for controlling the maintenance system 100. The computer program for the maintenance system 100 may also be recorded and distributed in a computer-readable recording medium, such as the recording medium 206 and the CD-ROM 213, as an installable or executable file.

The computer programs may be recoded and provided in another detachable computer-readable recording medium, such as a compact disc recordable (CD-R), a digital versatile disc (DVD), and a Blu-ray Disc.

Functional Configuration According to the Present Embodiment

Figure 4:
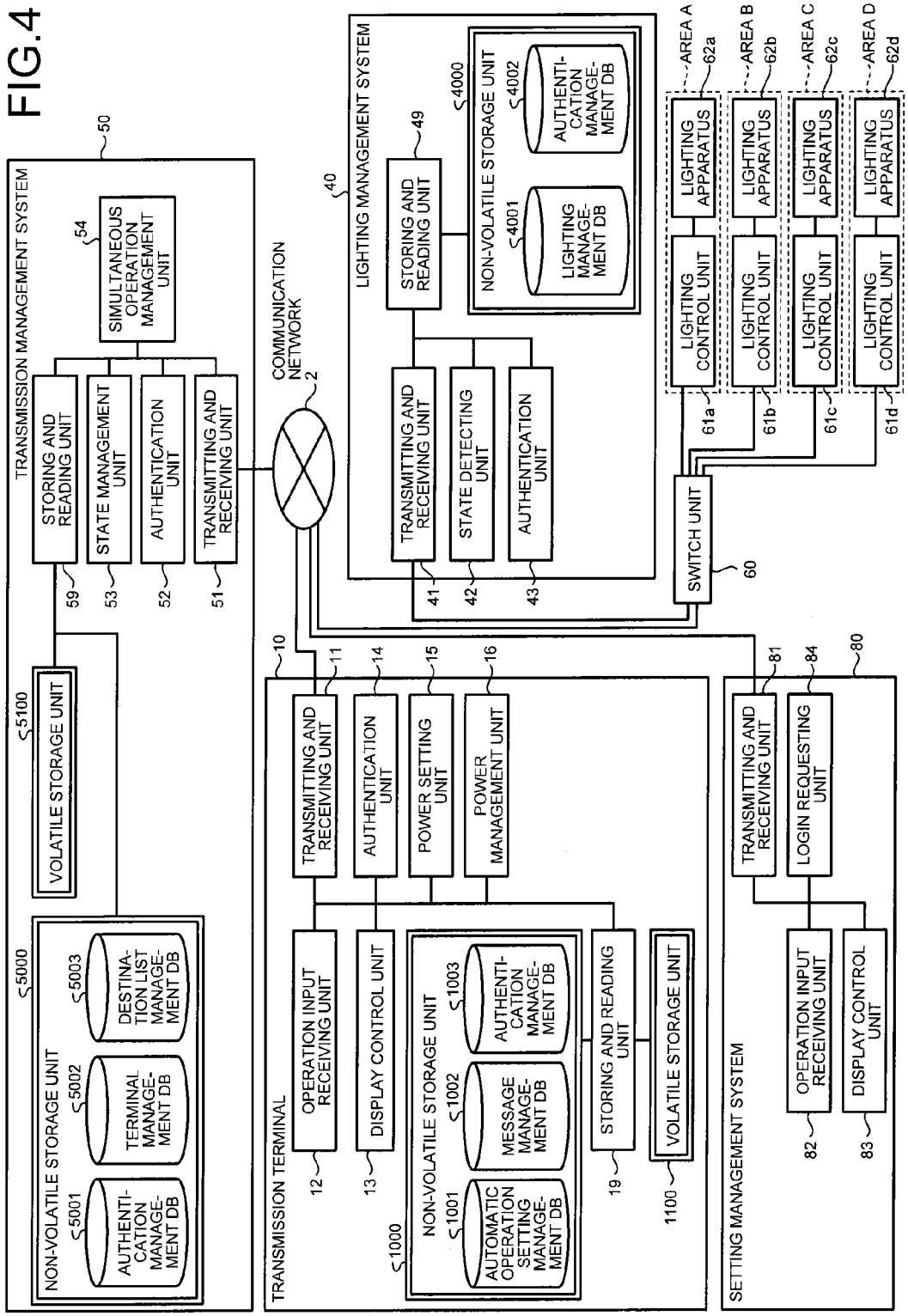
FIG. 4 is a diagram of an example of functional blocks of the transmission terminal, the lighting management system, the transmission management system, the setting management system, lighting apparatuses, and other components included in the transmission system according to the embodiment.

FIG. 4 is a diagram of an example of functional blocks of the transmission terminal, the lighting management system, the transmission management system, the setting management system, lighting apparatuses, and other components included in the transmission system according to the embodiment. The following describes the functional configuration of the apparatuses according to the present embodiment with reference to FIG. 4.

As illustrated in FIG. 4, the transmission terminal 10, the lighting management system 40, the transmission management system 50, the switch unit 60, and the setting management system 80 are connected so as to perform data communications via the communication network 2. Because the relay apparatus 30, the computer program providing system 90, and the maintenance system 100 illustrated in FIG. 1 are not directly related to explanations of the operations of the transmission system 1 according to the present embodiment, they are not illustrated in FIG. 4.

Functional Configuration of the Transmission Terminal

As illustrated in FIG. 4, the transmission terminal 10 includes a transmitting and receiving unit 11, an operation input receiving unit 12, a display control unit 13, an authentication unit 14, a power setting unit 15, a power management unit 16, and a storing and reading unit 19. These functional units are functions or units provided by some of the components illustrated in FIG. 2 operating in response to an instruction from the CPU 101 according to the computer program stored in the ROM 102, the SSD 105, or the medium 106. The transmission terminal 10 further includes a volatile storage unit 1100 and a non-volatile storage unit 1000. The volatile storage unit 1100 is provided by the RAM 103 illustrated in FIG. 2, whereas the non-volatile storage unit 1000 is provided by the SSD 105 illustrated in FIG. 2.

Authentication Management Table

FIG. 5 is a conceptual diagram of an authentication management table. The following describes the authentication management table with reference to FIG. 5.

The non-volatile storage unit 1000 stores therein an authentication management DB 1003 including the authentication management table illustrated in FIG. 5. The authentication management table manages an ID for identifying the user who requests login authentication from the transmission terminal 10 in a manner associated with a password. The ID is information for identifying the user, and the password is information used for login authentication. The authentication management table in FIG. 5, for example, indicates that the password of the setting management system 80 identified by the ID "80*aa*" is "aaaa". While one setting management system 80 is provided in FIG. 1, a plurality of setting management systems 80 may be provided.

The ID of the setting management system 80 is identification information, such as characters, symbols, figures, and various marks, used to identify the user who uses the setting management system 80. The ID of the setting management system 80 may be identification information obtained by combining at least two of the characters, the symbols, the figures, and the various marks.

Automatic Operation Setting Management Table

FIG. 6 is a conceptual diagram of an automatic operation setting management table. The following describes the automatic operation setting management table with reference to FIG. 6.

The non-volatile storage unit 1000 stores therein an automatic operation setting management DB 1001 including the automatic operation setting management table illustrated in FIG. 6. The automatic operation setting management table manages automatic operation setting information of each transmission terminal 10. Specifically, as illustrated in FIG. 6, the automatic operation setting management table manages automatic start setting and automatic shutdown setting as the automatic operation setting information.

The automatic start setting is information on whether the transmission terminal 10 automatically starts when it receives a start instruction from the transmission management system 50. If the automatic start setting is set to "1", the transmission terminal 10 automatically starts; whereas if the automatic start setting is set to "0", the transmission terminal 10 does not automatically start, for example.

The automatic shutdown setting is information on whether the transmission terminal 10 automatically performs shutdown processing (stop processing) (hereinafter, referred to as automatic shutdown processing) when it receives a shutdown instruction from the transmission management system 50. If the automatic shutdown setting is set to "1", the transmission terminal 10 performs the automatic shutdown processing; whereas if the automatic shutdown setting is set to "0", the transmission terminal 10 does not perform the automatic shutdown processing, for example.

The automatic operation setting management table in FIG. 6, for example, indicates that the automatic start setting is set to "1" (automatically start) and that the automatic shutdown setting is set to "1" (perform the automatic shutdown processing).

The automatic operation setting information, for example, may further include time-out setting besides the automatic start setting and the automatic shutdown setting. The time-out setting is information on a grace time from when the transmission terminal 10 receives the shutdown instruction from the transmission management system 50 to when it actually performs the automatic shutdown processing.

Message Management Table

FIG. 7 is a conceptual diagram of a message management table. The following describes the message management table with reference to FIG. 7.

The non-volatile storage unit 1000 stores therein a message management DB 1002 including the message management table illustrated in FIG. 7. The message management table manages a message to be displayed on the display 120 of the transmission terminal 10 in a manner associated with a message ID. The message ID is information for uniquely identifying a message, and the message is character string information to be displayed on the display 120. The message management table in FIG. 7 indicates that, in a case where the message ID is "2", the corresponding message is "the apparatus has automatically started by automatic operation setting", for example.

The message ID is identification information, such as a character, a symbol, a figure, and various marks, used to uniquely identify the message. The message ID may be identification information obtained by combining at least two of the character, the symbol, the figure, and the various marks. The contents of the messages indicated by the message management table in FIG. 7 are given by way of example only, and another number of messages may be registered. The contents of the messages are not limited to those illustrated in FIG. 7.

Functional Units of the Transmission Terminal

The following describes the functional units of the transmission terminal 10 in greater detail. The following description of the functional units of the transmission terminal 10 also explains the relation with the main components that provide the functional units of the transmission terminal 10 out of the components in FIG. 2.

The transmitting and receiving unit 11 is provided by the network I/F 111 illustrated in FIG. 2. The transmitting and receiving unit 11 is a functional unit that transmits and receives various data to and from other transmission terminals or each system via the communication network 2. The transmitting and receiving unit 11 receives a start instruction or a shutdown instruction from the transmission management system 50. When the transmission terminal 10 starts, the transmitting and receiving unit 11 transmits the type, an operation flag, the IP address, the terminal ID, the terminal name, and the automatic operation setting information of the transmitting terminal 10 to the transmission management system 50. When the transmission terminal 10 is to shut down, the transmitting and receiving unit 11 transmits the type, the operation flag, and the IP address of the transmitting terminal 10 to the transmission management system 50. The type of the transmission terminal 10 is information for identifying the model of the transmission terminal 10. In a case where the transmission terminal 10 is an MFP, for example, the type is denoted by "MFP". In a case where the transmission terminal 10 is a teleconferencing apparatus, the type is denoted by "TVCA". In a case where the transmission terminal 10 is a liquid-crystal touch panel with a whiteboard function, the type is denoted by "TPWB". In a case where the transmission terminal 10 is a projector, the type is denoted by "PJ". The type of the transmission terminal 10 is stored in the transmission terminal 10 in advance. The IP address is an IP address allocated to the transmission terminal 10.

The operation input receiving unit 12 is provided by the operation button 108 and the power switch 109 illustrated in FIG. 2. The operation input receiving unit 12 is a functional unit that receives various types of input from the user. When the user turns on the power switch 109 in the operation input receiving unit 12 illustrated in FIG. 2, for example, the transmission terminal 10 starts. The transmitting and receiving unit 11 transmits an operation flag indicating that the power of the transmission terminal 10 is turned on to the transmission management system 50 as described above.

By contrast, when the user turns off the power switch 109 from the on-state, the transmitting and receiving unit 11 transmits an operation flag indicating that the power of the transmission terminal 10 is turned off to the transmission management system 50 as described above. The transmission terminal 10 then performs shutdown processing, thereby turning off the power. Thus, the transmission management system 50 can grasp whether the power of the transmission terminal 10 is on or off.

The display control unit 13 is provided by the display I/F 117 and other components illustrated in FIG. 2. The display control unit 13 is a functional unit that performs control to transmit image data to the external display 120. When the transmitting and receiving unit 11 receives a start instruction from the transmission management system 50, and the transmission terminal 10 starts, the display control unit 13 displays the fact that the transmission terminal 10 automatically started on the display 120. When the transmitting and receiving unit 11 receives a shutdown instruction from the transmission management system 50, the display control unit 13 displays the fact that the transmission terminal 10 is to automatically shut down on the display 120.

The authentication unit 14 is a functional unit that performs login authentication. The authentication unit 14 performs login authentication by: searching the authentication management table (refer to FIG. 5) in the non-volatile storage unit 1000 using the ID and the password included in login request information received from the setting management system 80 via the transmitting and receiving unit 11 as a search key; and determining whether the authentication management table stores therein an ID and a password identical to those included in the login request information.

The power setting unit 15 is a functional unit that acquires the automatic operation setting information currently set from the automatic operation setting management DB 1001. Specifically, when the power switch 109 is turned on from the off-state or when the transmitting and receiving unit 11 receives a start instruction from the transmission management system 50, the power setting unit 15 acquires the automatic operation setting information from the automatic operation setting management DB 1001.

The power management unit 16 is a functional unit that controls, when the power switch 109 is turned on or off or when a start instruction or a shutdown instruction is received from the transmission management system 50, the start processing or the shutdown processing performed by the transmission terminal 10. Specifically, when the power switch 109 is turned on from the off-state or when a start instruction is received from the transmission management system 50, the power management unit 16 turns on the power of the transmission terminal 10, thereby starting the transmission terminal 10. By contrast, when the power switch 109 is turned off from the on-state or when a shutdown instruction is received from the transmission management system 50, the power management unit 16 causes the transmission terminal 10 to perform the shutdown processing, thereby turning off the power of the transmission terminal 10.

The storing and reading unit 19 is provided by an instruction from the CPU 101 illustrated in FIG. 2 and the SSD 105 illustrated in FIG. 2, for example. The storing and reading unit 19 is a functional unit that stores various data in the non-volatile storage unit 1000 and reads the various data stored in the non-volatile storage unit 1000. The non-volatile storage unit 1000 stores therein the automatic operation setting management DB 1001, the message management DB 1002, and the authentication management DB 1003. The storing and reading unit 19 also stores various data in the volatile storage unit 1100 and reads the various data stored in the volatile storage unit 1100. In a case where the transmission terminal 10 is a teleconferencing apparatus, for example, the volatile storage unit 1100 updates and stores therein content data received in a conversation with a destination terminal every time the content data is received.

Functional Configuration of the Lighting Management System

As illustrated in FIG. 4, the lighting management system 40 includes a transmitting and receiving unit 41, a state detecting unit 42 (state detecting unit), an authentication unit 43, and a storing and reading unit 49. These functional units are functions or units provided by some of the components illustrated in FIG. 3 operating in response to an instruction from the CPU 201 according to the computer program stored in the ROM 202, the external storage device 205, the recording medium 206, or the CD-ROM 213. The lighting management system 40 further includes a non-volatile storage unit 4000 provided by the external storage device 205 illustrated in FIG. 3.

Authentication Management Table

Similarly to the transmission terminal 10, the non-volatile storage unit 4000 stores therein an authentication management DB 4002 including the authentication management table illustrated in FIG. 5. The authentication management table manages an ID for identifying the user who requests login authentication from the lighting management system 40 in a manner associated with a password.

Lighting Management Table

FIG. 8 is a conceptual diagram of a lighting management table. The following describes the lighting management table with reference to FIG. 8.

The non-volatile storage unit 4000 stores therein a lighting management DB 4001 including the lighting management table illustrated in FIG. 8. The lighting management table manages a lighting state flag indicating whether at least one of lighting apparatuses is currently on or all the lighting apparatuses are currently off in each area on each floor. In the lighting management table illustrated in FIG. 8, for example, the lighting state flag in the "area C" on the floor "1F" is "1", which indicates that at least one of lighting apparatuses in the area is currently on; whereas the lighting state flag in the "area D" on the floor "3F" is "0", which indicates that all the lighting apparatuses in the area are currently off.

The lighting management table illustrated in FIG. 8 indicates the lighting state of the lighting apparatuses in each area on each floor. The lighting management system 40 is provided singly on each floor to manage the lighting state of the lighting apparatuses on the floor as described above. Thus, the lighting management table simply needs to indicate the lighting state of the lighting apparatuses in each area on the floor where the lighting management system 40 is placed.

Functional Units of the Lighting Management System

The following describes the functional units of the lighting management system 40 in greater detail. The following description of the functional units of the lighting management system 40 also explains the relation with the main components that provide the functional units of the lighting management system 40 out of the components in FIG. 3.

The transmitting and receiving unit 41 is provided by the network I/F 209 illustrated in FIG. 3. The transmitting and receiving unit 41 is a functional unit that transmits and receives various data to and from the transmission terminal 10 or each system via the switch unit 60 and the communication network 2. Specifically, when all the lighting apparatuses on the floor the lighting state of which is managed by the lighting management system 40 are turned off, for example, the transmitting and receiving unit 41 transmits an operation flag (=0) and the IP addresses of the lighting control units (lighting control units 61a to 61d in FIG. 4) managed by the lighting management system 40 to the transmission management system 50. By contrast, when at least a part of the lighting apparatuses on the floor the lighting state of which is managed by the lighting management system 40 is turned on from the state where all of them are off, the transmitting and receiving unit 41 transmits an operation flag (=1) and the IP addresses of the lighting control units (lighting control units 61a to 61d in FIG. 4) managed by the lighting management system 40 to the transmission management system 50.

The state detecting unit 42 is a functional unit that refers to the lighting management table in the lighting management DB 4001 at predetermined time intervals (e.g., every one minute), thereby detecting the lighting state in each area on the floor managed by the lighting management system 40. The state detecting unit 42 performs logical addition on the lighting state flags of respective areas in the lighting management table, and determines that at least a part of the lighting apparatuses on the floor is turned on from the state where all of them are off, when the logical addition turns into "1" from "0". When the logical addition turns into "0" from "1", the state detecting unit 42 determines that all the lighting apparatuses on the floor are turned off from the state where at least a part of them is on.

The authentication unit 43 is a functional unit that performs login authentication. The authentication unit 43 performs login authentication by: searching the authentication management table (refer to FIG. 5) in the non-volatile storage unit 4000 using the ID and the password included in login request information received from the setting management system 80 via the transmitting and receiving unit 41 as a search key; and determining whether the authentication management table stores therein an ID and a password identical to those included in the login request information.

The storing and reading unit 49 is provided by an instruction from the CPU 201 illustrated in FIG. 3 and the external storage device 205 illustrated in FIG. 3, for example. The storing and reading unit 49 is a functional unit that stores various data in the non-volatile storage unit 4000 and reads the various data stored in the non-volatile storage unit 4000. The non-volatile storage unit 4000 stores therein the lighting management DB 4001 and the authentication management DB 4002. Specifically, the storing and reading unit 49 updates the lighting state flag in the lighting management table stored in the non-volatile storage unit 4000 based on the lighting state of the lighting apparatuses in each area received via the switch unit 60 and the transmitting and receiving unit 41.

Functional Configuration of the Transmission Management System

As illustrated in FIG. 4, the transmission management system 50 includes a transmitting and receiving unit 51 (transmitting unit), an authentication unit 52, a state management unit 53 (first identifying unit), a simultaneous operation management unit 54 (second identifying unit), and a storing and reading unit 59. These functional units are functions or units provided by some of the components illustrated in FIG. 3 operating in response to an instruction from the CPU 201 according to the computer program stored in the ROM 202, the external storage device 205, the recording medium 206, or the CD-ROM 213. The transmission management system 50 further includes a volatile storage unit 5100 and a non-volatile storage unit 5000. The volatile storage unit 5100 is provided by the RAM 203 illustrated in FIG. 3, whereas the non-volatile storage unit 5000 is provided by the external storage device 205 illustrated in FIG. 3.

Authentication Management Table

Similarly to the transmission terminal 10, the non-volatile storage unit 5000 stores therein an authentication management DB 5001 including the authentication management table illustrated in FIG. 5. The authentication management table manages an ID for identifying the user who requests login authentication from the transmission management system 50 in a manner associated with a password.

Terminal Management Table

FIG. 9 is a conceptual diagram of a terminal management table. The following describes the terminal management table with reference to FIG. 9.

The non-volatile storage unit 5000 stores therein the terminal management DB 5002 including the terminal management table illustrated in FIG. 9. The terminal management table manages information on transmission terminals, apparatuses, and systems, including the IP address, the terminal ID, the terminal name, the floor on which the terminal or the like is placed, the type, the operation flag, and the automatic operation setting information (automatic start setting and automatic shutdown setting) in a manner associated with one another. The terminal management table also stores therein an administrator setting flag. The record with the administrator setting flag of "1" is information set by an administrator. Specifically, as illustrated in FIG. 9, each floor and a range of the IP addresses allocated to the floor are set by the administrator.

The IP address is information for uniquely identifying a transmission terminal, an apparatus, or a system (hereinafter, simply referred to as an apparatus or the like) on the network. The IP address may be fixedly allocated or may be dynamically allocated when the apparatus or the like is connected to the network. The terminal management table has a field of the IP address corresponding to a system that manages a plurality of apparatuses to which respective IP addresses are allocated (the lighting management system 40 that manages the lighting control units 61 in the example in FIG. 4). The field is provided with the range of the IP addresses of the managed apparatuses. The field of the IP address in the record with the administrator setting flag of "1" is provided with the range of the IP addresses allocated to the floor as described above.

The terminal ID is an ID fixedly determined and used for identifying the apparatus or the like. The terminal name is information indicating the name of the apparatus or the like.

The floor is information indicating the number of the floor on which the apparatus or the like is placed. The type is information for identifying the model of the apparatus or the like. The types of the transmission terminal 10 are already described. In FIG. 9, the type of the lighting management system 40 is denoted by "LMS".

Whether the apparatus or the like is operating is indicated by an operation flag. The operation flag of "1", for example, indicates that the apparatus or the like is operating; whereas the operation flag of "0" indicates that the power of the apparatus or the like is off. In the case of the lighting management system 40, however, the operation flag of "1" indicates that at least one of the lighting apparatuses 62 controlled by the managed lighting control units 61 is on, whereas the operation flag of "0" indicates that all the lighting apparatuses 62 controlled by the managed lighting control units 61 are off.

The automatic start setting and the automatic shutdown setting are the same as those described in the automatic operation setting management table illustrated in FIG. 6.

The terminal management table in FIG. 9, for example, indicates that the record with the administrator setting of "1" and the floor of "1F" has the IP addresses in a range of "192.168.1.0/24", for example. The terminal management table also indicates that the record with the floor of "1F" and the type of "LMS" (lighting management system 40) has the IP addresses in a range of "192.168.1.8/30", that is, four IP addresses from "192.168.1.8" to "192.168.1.11". The terminal management table also indicates that the record with the floor of "1F" and the type of "TVCA" (transmission terminal 10) has the following items: the IP address of "192.168.1.20", the terminal ID of "TV1a", the terminal name of "Tokyo office TV1A terminal", the operation flag of "1" (operating), the automatic start setting of "1" (automatically start), and the automatic shutdown setting of "1" (automatically shut down).

Destination List Management Table

FIG. 10 is a conceptual diagram of a destination list management table. The following describes the destination list management table with reference to FIG. 10.

The non-volatile storage unit 5000 stores therein the destination list management DB 5003 including the destination list management table illustrated in FIG. 10. The destination list management table manages with which terminal the transmission terminal 10 serving as the teleconferencing apparatus is grouped to conduct a teleconference. Specifically, the destination list management table manages a request source terminal ID and a destination terminal ID in a manner associated with each other. The request source terminal ID is the terminal ID of the transmission terminal 10 that transmits a start request for a teleconference. The destination terminal ID is the terminal ID of the transmission terminal 10 that receives the start request and applies for participation in the conference.

In the destination list management table illustrated in FIG. 10, for example, the teleconference group including the transmission terminal 10 denoted by the request source terminal ID of "TV1a" includes the transmission terminals 10 denoted by the destination terminal IDs of "TV2a", "TVF3a", "TVF4b", and "TVK1c".

The destination list management table also manages simultaneous operation setting for causing two terminals to simultaneously perform the automatic start operation or the automatic shutdown operation. In the destination list management table illustrated in FIG. 10, for example, the transmission terminal 10 with the terminal ID "TV1a" and the transmission terminal 10 with the terminal ID "TV2a" included in the same teleconference group are set to simultaneously operate by "*1". The transmission terminals 10 set to simultaneously operate are not necessarily included in the same teleconference group. As illustrated in FIG. 10, the transmission terminal 10 with the terminal ID "TVF4b" and the transmission terminal 10 with the terminal ID "TVF1k" included in different teleconference groups are set to simultaneously operate by "*3".

While the simultaneous operation setting is made such that two terminals simultaneously operate in the destination list management table illustrated in FIG. 10, the embodiment is not limited thereto. In other words, the simultaneous operation setting may be made such that three or more transmission terminals 10 simultaneously perform the automatic start operation or the automatic shutdown operation.

Functional Units of the Transmission Management System

The following describes the functional units of the transmission management system 50 in greater detail. The following description of the functional units of the transmission management system 50 also explains the relation with the main components that provide the functional units of the transmission management system 50 out of the components in FIG. 3.

The transmitting and receiving unit 51 is provided by the network I/F 209 illustrated in FIG. 3. The transmitting and receiving unit 51 is a functional unit that transmits and receives various data to and from the transmission terminal 10 or each system via the communication network 2. Specifically, when the transmitting and receiving unit 51 receives an operation flag (=1) from the lighting management system 40, and the operation flag of the lighting management system 40 registered in the terminal management table is updated with "1" from "0", the transmitting and receiving unit 51 transmits a start instruction to the transmission terminals 10 on the floor managed by the lighting management system 40. By contrast, when the transmitting and receiving unit 51 receives an operation flag (=0) from the lighting management system 40, and the operation flag of the lighting management system 40 registered in the terminal management table is updated with "0" from "1", the transmitting and receiving unit 51 transmits a shutdown instruction to the transmission terminals 10 on the floor managed by the lighting management system 40.

The authentication unit 52 is a functional unit that performs login authentication. The authentication unit 52 performs login authentication by: searching the authentication management table (refer to FIG. 5) in the non-volatile storage unit 5000 using the ID and the password included in login request information received from the setting management system 80 via the transmitting and receiving unit 51 as a search key; and determining whether the authentication management table stores therein an ID and a password identical to those included in the login request information.

The state management unit 53 is a functional unit that refers to the terminal management table when the transmitting and receiving unit 51 receives an operation flag from the lighting management system 40, thereby acquiring the IP address of the transmission terminal 10 the automatic start setting or automatic shutdown setting of which is "1". Specifically, when the transmitting and receiving unit 51 receives an operation flag (=1) from the lighting management system 40, and the operation flag of the lighting management system 40 registered in the terminal management table is updated with "1" from "0", the state management unit 53 acquires the IP address of the transmission terminal 10 the automatic start setting of which is "1". By contrast, when the transmitting and receiving unit 51 receives an operation flag (=0) from the lighting management system 40, and the operation flag of the lighting management system 40 registered in the terminal management table is updated with "0" from "1", the state management unit 53 acquires the IP address of the transmission terminal 10 the automatic shutdown setting of which is "1".

The simultaneous operation management unit 54 is a functional unit that refers to the destination list management table when the transmitting and receiving unit 51 receives an operation flag from the lighting management system 40, thereby acquiring the terminal ID of the transmission terminal 10 set to operate simultaneously with the transmission terminal 10 the automatic start setting or automatic shutdown setting of which is "1". Specifically, when the transmitting and receiving unit 51 receives an operation flag (=1) from the lighting management system 40, and the operation flag of the lighting management system 40 registered in the terminal management table is updated with "1" from "0", the simultaneous operation management unit 54 acquires the terminal ID of the transmission terminal 10 set to operate simultaneously with the transmission terminal 10 the automatic start setting of which is "1". By contrast, when the transmitting and receiving unit 51 receives an operation flag (=0) from the lighting management system 40, and the operation flag of the lighting management system 40 registered in the terminal management table is updated with "0" from "1", the simultaneous operation management unit 54 acquires the terminal ID of the transmission terminal 10 set to operate simultaneously with the transmission terminal 10 the automatic shutdown setting of which is "1".

The storing and reading unit 59 is provided by an instruction from the CPU 201 illustrated in FIG. 3 and the external storage device 205 illustrated in FIG. 3, for example. The storing and reading unit 59 is a functional unit that stores various data in the non-volatile storage unit 5000 and reads the various data stored in the non-volatile storage unit 5000. The non-volatile storage unit 5000 stores therein the authentication management DB 5001, the terminal management DB 5002, and the destination list management DB 5003. The storing and reading unit 59 also stores various data in the volatile storage unit 5100 and reads the various data stored in the volatile storage unit 5100.

Functional Configuration of the Units Relating to Lighting

As illustrated in FIG. 4, the switch unit 60 is connected to the communication network 2, the lighting management system 40, and the lighting control units 61a to 61d. The lighting control units 61a to 61d are connected to lighting apparatuses 62a to 62d, respectively. As illustrated in FIG. 4, the lighting control units 61a to 61d belong to areas A to D, respectively, and the lighting apparatuses 62a to 62d also belong to the areas A to D, respectively. To specify a certain lighting control unit of the lighting control units 61a to 61d or collectively call the lighting control units 61a to 61d, they are simply referred to as a "lighting control unit 61". To specify a certain lighting apparatus of the lighting apparatuses 62a to 62d or collectively call the lighting apparatuses 62a to 62d, they are simply referred to as a "lighting apparatus 62". The lighting management system 40, the lighting control units 61, and the lighting apparatuses 62 illustrated in FIG. 4 are placed on a specific floor. While FIG. 4 illustrates four lighting control units 61 and four lighting apparatuses 62, the embodiment is not limited thereto. In other words, a plurality of lighting control units 61 and lighting apparatuses 62 may be placed in each area, and the number of areas on the floor is not limited to four.

The lighting control unit 61 is a device that turns on or off the lighting apparatus 62 by supplying or cutting off the power to the lighting apparatus 62. The lighting control unit 61 is connected to a switch, which is not illustrated. When the user turns on the switch, the lighting control unit 61 turns on the lighting apparatus 62; whereas when the user turns off the switch, the lighting control unit 61 turns off the lighting apparatus 62. The lighting control unit 61 transmits a lighting state flag indicating the lighting state of the lighting apparatus 62 to the lighting management system 40 via the switch unit 60. The storing and reading unit 49 reflects the lighting state flag of the lighting apparatus 62 received from the lighting control unit 61 via the switch unit 60 and the transmitting and receiving unit 41 in the lighting management table stored in the non-volatile storage unit 4000. The lighting control units 61 are each provided with the IP address for uniquely identifying the lighting control unit.

The lighting apparatus 62 is a lighting appliance, such as a fluorescence light and a light-emitting diode (LED).

Functional Configuration of the Setting Management System

As illustrated in FIG. 4, the setting management system 80 includes a transmitting and receiving unit 81, an operation input receiving unit 82 (a first setting unit, a second setting unit, and a third setting unit), a display control unit 83, and a login requesting unit 84. These functional units are functions or units provided by some of the components illustrated in FIG. 3 operating in response to an instruction from the CPU 201 according to the computer program stored in the ROM 202, the external storage device 205, the recording medium 206, or the CD-ROM 213.

The transmitting and receiving unit 81 is provided by the network I/F 209 illustrated in FIG. 3. The transmitting and receiving unit 81 is a functional unit that transmits and receives various data to and from the transmission terminal 10 or each system via the communication network 2. Specifically, the transmitting and receiving unit 81 transmits login request information (including an ID and a password) used to log in to the transmission terminal 10, the lighting management system 40, or the transmission management system 50, for example.

The operation input receiving unit 82 is provided by the keyboard 211 and the mouse 212 illustrated in FIG. 3. The operation input receiving unit 82 is a functional unit that receives various types of input from the user. The operation input receiving unit 82, for example, receives the ID and the password used to log in to the transmission terminal 10, the lighting management system 40, or the transmission management system 50.

The display control unit 83 is a functional unit that performs control to transmit image data to the display 208 illustrated in FIG. 3. The display control unit 83, for example, displays a login screen used to log in to the transmission terminal 10, the lighting management system 40, or the transmission management system 50 or a setting screen used to perform various settings after the login on the display 208.

The login requesting unit 84 is provided by an instruction from the CPU 201 illustrated in FIG. 3. The login requesting unit 84 is a functional unit that generates login request information used to log in to the transmission terminal 10, the lighting management system 40, or the transmission management system 50 and transmits it via the transmitting and receiving unit 81.

Setting Operation Performed by the Setting Management System

The following describes a setting operation performed by the setting management system 80 on the transmission terminal 10, the lighting management system 40, or the transmission management system 50.

Setting Operation on the Transmission Management System

FIG. 11 is a diagram of an example of setting of network information. The following describes an operation of setting the network information performed by the setting management system 80 on the transmission management system 50 with reference to FIG. 11.

The login requesting unit 84 of the setting management system 80 generates login request information including an ID and a password received by the operation input receiving unit 82. The login requesting unit 84 transmits the login request information to the transmission management system 50 via the transmitting and receiving unit 81. The authentication unit 52 of the transmission management system 50 determines whether the ID and the password included in the login request information received via the transmitting and receiving unit 51 are registered in the authentication management table in the non-volatile storage unit 5000. If the ID and the password are registered, the authentication unit 52 permits the login.

After logging in to the transmission management system 50 by performing the login operation on the setting management system 80, the administrator sets the network information illustrated in FIG. 11 through the operation input receiving unit 82. Specifically, the administrator sets the range of the IP addresses allocated to each floor through the operation input receiving unit 82 as illustrated in FIG. 11. The network information set by the administrator is transmitted by the transmitting and receiving unit 81 via the communication network 2 and is received by the transmitting and receiving unit 51 of the transmission management system 50. The storing and reading unit 59 of the transmission management system 50 registers the network information received by the transmitting and receiving unit 51 in the terminal management table. In the terminal management table illustrated in FIG. 9, the administrator sets and registers a range of the IP addresses of "192.168.1.0/24" for the floor "1F" and sets and registers a range of the IP addresses of "192.168.2.0/24" for the floor "2F".

After logging in to the transmission management system 50, the administrator sets a teleconference group managed by the destination list management table illustrated in FIG. 10 through the operation input receiving unit 82. The information on newly creation, addition, update, or deletion of the teleconference group set by the administrator is transmitted by the transmitting and receiving unit 81 via the communication network 2 and is received by the transmitting and receiving unit 51 of the transmission management system 50. The storing and reading unit 59 of the transmission management system 50 reflects the information on newly creation, addition, update, or deletion of the teleconference group received by the transmitting and receiving unit 51 in the destination list management table.

Figures 12, 13:
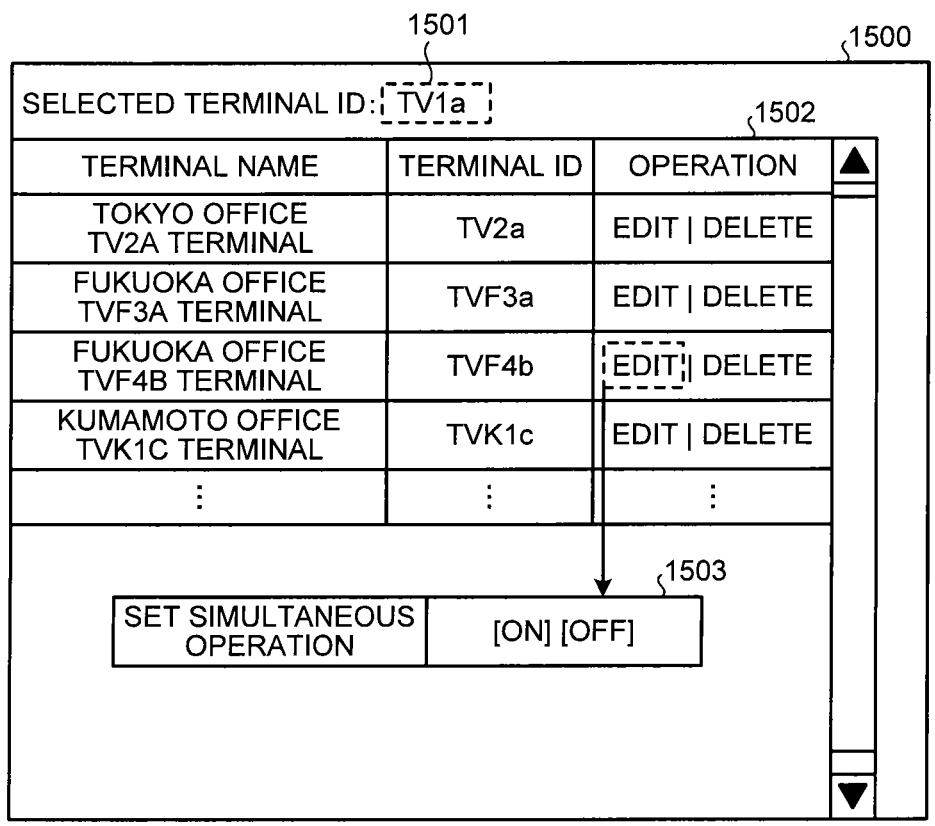
FIG. 12 is a diagram of an example of a simultaneous operation setting screen for setting a simultaneous operation among transmission terminals.
FIG. 13 is a diagram of an example of setting of area information.

FIG. 12 is a diagram of an example of a simultaneous operation setting screen for setting a simultaneous operation among the transmission terminals. The following describes an operation of setting a simultaneous operation among the transmission terminals 10 performed by the setting management system 80 on the destination list management table of the transmission management system 50 with reference to FIG. 12.

By performing the same operation process as that described above, the administrator logs in to the transmission management system 50 from the setting management system 80. After logging in to the transmission management system 50 by performing the login operation on the setting management system 80, the administrator selects the terminal ID of a transmission terminal 10 on which simultaneous operation setting is to be performed through the operation input receiving unit 82. On a simultaneous operation setting screen 1500 illustrated in FIG. 12, the administrator selects "TV1a" as the terminal ID.

The selected terminal ID, for example, is displayed in a selected terminal ID display part 1501 on the simultaneous operation setting screen 1500 displayed by the display control unit 83 as illustrated in FIG. 12. The transmitting and receiving unit 81 of the setting management system 80 receives the terminal IDs of the transmission terminals 10 belonging to the same teleconference group as that of the selected terminal ID from the destination list management table of the transmission management system 50 via the communication network 2. The display control unit 83 displays the terminal IDs received by the transmitting and receiving unit 81 in a terminal list display part 1502 on the simultaneous operation setting screen 1500.

In a case where the terminal ID of the transmission terminal 10 to be set to operate simultaneously with the transmission terminal 10 with the terminal ID of "TV1a" is "TVF3a", for example, the administrator presses an operation portion "edition" corresponding to "TVF3a" through the operation input receiving unit 82. As a result, the simultaneous operation setting screen 1500 displays a simultaneous operation setting dialog 1503. The administrator selects "ON" in the simultaneous operation setting dialog 1503 through the operation input receiving unit 82. Thus, the transmission terminal 10 with the terminal ID of "TVF3a" is set to operate simultaneously with the transmission terminal 10 with the terminal ID of "TV1a". In this case, "*" or the like may be displayed near the terminal ID "TVF3a" set to simultaneously operate, thereby indicating that the terminal ID "TVF3a" is set to operate simultaneously with the terminal ID "TV1a", for example. The information on the simultaneous operation setting performed by the administrator is transmitted by the transmitting and receiving unit 81 via the communication network 2 and is received by the transmitting and receiving unit 51 of the transmission management system 50. The storing and reading unit 59 of the transmission management system 50 registers the information on the simultaneous operation setting received by the transmitting and receiving unit 51 in the destination list management table. If "OFF" is selected in the simultaneous operation setting dialog 1503, no simultaneous operation setting is performed, and the simultaneous operation setting dialog 1503 disappears.

While the administrator logs in to the transmission management system 50 via the setting management system 80 to set the network information, the teleconference group, and the simultaneous operation, the embodiment is not limited thereto. In other words, the administrator may set the network information, the teleconference group, and the simultaneous operation directly in the transmission management system 50 by operating the keyboard 211 and/or the mouse 212 of the transmission management system 50.

While the simultaneous operation setting is performed on the transmission terminals 10 belonging to the same teleconference group as that of the selected transmission terminal 10 on the simultaneous operation setting screen 1500 illustrated in FIG. 12, the embodiment is not limited thereto. The simultaneous operation setting may be performed on the transmission terminals 10 belonging to teleconference groups different from that of the selected transmission terminal 10.

Setting Operation on the Lighting Management System

FIG. 13 is a diagram of an example of setting of area information. The following describes an operation of setting the area information performed by the setting management system 80 on the lighting management system 40 with reference to FIG. 13.

The login requesting unit 84 of the setting management system 80 generates login request information including an ID and a password received by the operation input receiving unit 82. The login requesting unit 84 transmits the login request information to the lighting management system 40 via the transmitting and receiving unit 81. The authentication unit 43 of the lighting management system 40 determines whether the ID and the password included in the login request information received via the transmitting and receiving unit 41 are registered in the authentication management table in the non-volatile storage unit 4000. If the ID and the password are registered, the authentication unit 43 permits the login.

After logging in to the lighting management system 40 by performing the login operation on the setting management system 80, the administrator sets the area information illustrated in FIG. 13 through the operation input receiving unit 82. Specifically, the administrator sets the areas (areas A to D in FIG. 13) on the floor managed by the lighting management system 40 to which the administrator logs in through the operation input receiving unit 82 as illustrated in FIG. 13. The area information set by the administrator is transmitted by the transmitting and receiving unit 81 via the communication network 2 and the switch unit 60 and is received by the transmitting and receiving unit 41 of the lighting management system 40. The storing and reading unit 49 of the lighting management system 40 constructs the lighting management table illustrated in FIG. 8 based on the area information received by the transmitting and receiving unit 41.

While the administrator logs in to the lighting management system 40 via the setting management system 80 to set the area information, the embodiment is not limited thereto. In other words, the administrator may set the area information directly in the lighting management system 40 by operating the keyboard 211 and/or the mouse 212 of the lighting management system 40.

Setting Operation on the Transmission Terminal

Figure 14A:
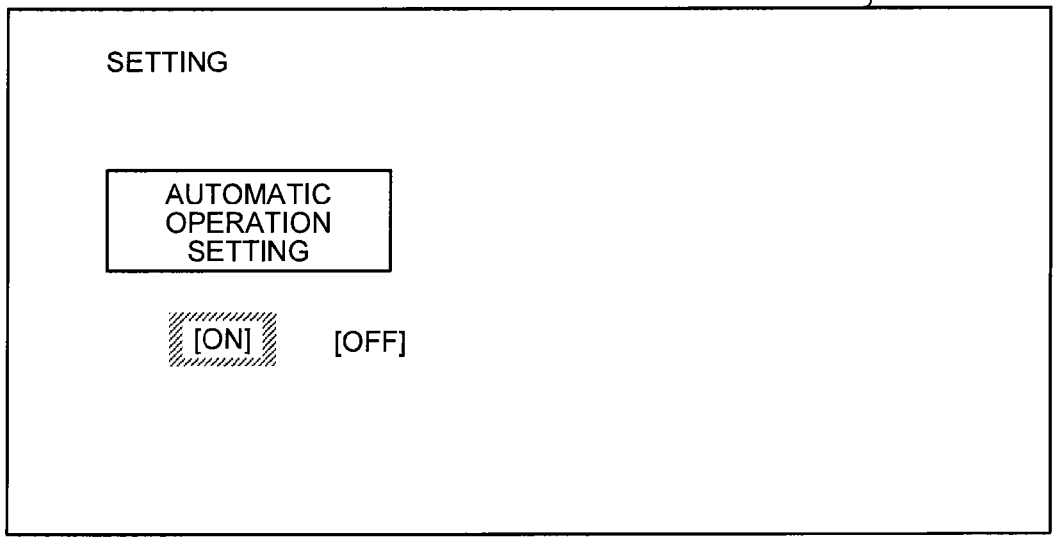
FIGS. 14A and 14B are diagrams of an example of a setting screen for automatic operation setting information.
Figure 14B:
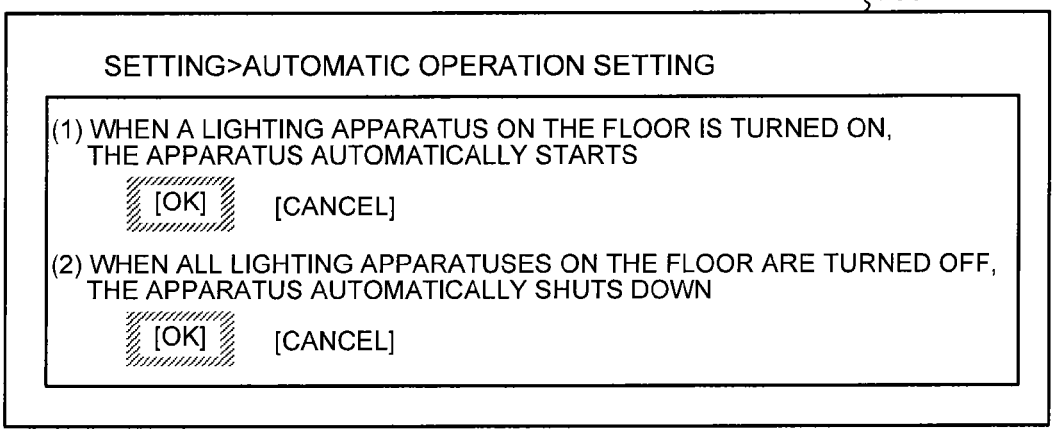

FIGS. 14A and 14B are diagrams of an example of a setting screen for the automatic operation setting information. The following describes an operation of setting the automatic operation setting information performed by the setting management system 80 on the transmission terminal 10 with reference to FIGS. 14A and 14B.

The login requesting unit 84 of the setting management system 80 generates login request information including an ID and a password received by the operation input receiving unit 82. The login requesting unit 84 transmits the login request information to the transmission terminal 10 via the transmitting and receiving unit 81. The authentication unit 14 of the transmission terminal 10 determines whether the ID and the password included in the login request information received via the transmitting and receiving unit 11 are registered in the authentication management table in the non-volatile storage unit 1000. If the ID and the password are registered, the authentication unit 14 permits the login.

After logging in to the transmission terminal 10 by performing the login operation on the setting management system 80, the administrator sets the automatic operation setting information through the operation input receiving unit 82. The administrator performs the setting operation while referring to the setting screen for the automatic operation setting information illustrated in FIG. 14 displayed on the display 120. Specifically, the administrator determines whether to perform automatic operation setting on a setting screen 2000 illustrated in FIG. 14A through the operation input receiving unit 82. If "ON" is selected in the selecting operation, the display control unit 13 displays an automatic operation setting screen 2001 illustrated in FIG. 14B on the display 120.

Subsequently, the administrator performs a setting operation for automatic start setting and automatic shutdown setting corresponding to the automatic operation setting information on the automatic operation setting screen 2001 illustrated in FIG. 14B through the operation input receiving unit 82. In the example in FIG. 14B, the automatic start setting is set to "ON", and the automatic shutdown setting is set to "ON". The automatic operation setting information set by the administrator is transmitted by the transmitting and receiving unit 81 via the communication network 2 and is received by the transmitting and receiving unit 11 of the transmission terminal 10. The storing and reading unit 19 of the transmission terminal 10 registers the automatic operation setting information received by the transmitting and receiving unit 11 in the automatic operation setting management table.

While the administrator logs in to the transmission terminal 10 via the setting management system 80 to set the automatic operation setting information, the embodiment is not limited thereto. In other words, the administrator may set the automatic operation setting information directly in the transmission terminal 10 by operating the operation input receiving unit 12 of the transmission terminal 10.

Operations Performed by the Transmission Terminal at Start-Up

FIG. 15 is a sequence diagram of an example of operations performed by the transmission terminal at start-up. FIG. 16 is a diagram of an example of the contents of information transmitted by the transmission terminal. The following describes the operations performed by the transmission terminal 10 at start-up with reference to FIGS. 15 and 16.

Step S11

If the power switch 109 is turned on from the off-state, or if the transmitting and receiving unit 11 receives a start signal from the transmission management system 50 via the communication network 2, the power management unit 16 of the transmission terminal 10 turns on the power of the transmission terminal 10, thereby starting the transmission terminal 10.

Step S12

The power setting unit 15 of the transmission terminal 10 acquires the automatic operation setting information currently set from the automatic operation setting management table in the automatic operation setting management DB 1001.

Step S13

The transmitting and receiving unit 11 of the transmission terminal 10 transmits the information on the transmission terminal 10 illustrated in FIG. 16, including the IP address, the type, the operation flag (=1), the terminal ID, the terminal name, and the automatic operation setting information acquired by the power setting unit 15 to the transmission management system 50 via the communication network 2. As illustrated in FIG. 16, the transmitted automatic operation setting information is automatic start setting and automatic shutdown setting managed in the automatic operation setting management table. The transmitting and receiving unit 51 of the transmission management system 50 receives the IP address, the type, the operation flag (=1), the terminal ID, the terminal name, and the automatic operation setting information transmitted from the transmitting and receiving unit 11.

Step S14

The storing and reading unit 59 of the transmission management system 50 writes the IP address, the type, the operation flag (=1), the terminal ID, the terminal name, and the automatic operation setting information received by the transmitting and receiving unit 51 in the terminal management table in the terminal management DB 5002. Specifically, the storing and reading unit 59 uses the received IP address as a search key to determine whether a record of the IP address is present in the terminal management table. If the IP address is present, the storing and reading unit 59 updates the corresponding record with the type, the operation flag, and the automatic operation setting information. By contrast, if the received IP address is not present in the terminal management table, the storing and reading unit 59 creates a new record. The storing and reading unit 59 acquires the value of the floor by referring to a record having the administrator setting flag of "1" and including the received IP address. The storing and reading unit 59 then writes the IP address, the floor, the type, the operation flag, the terminal ID, the terminal name, and the automatic operation setting information in the record.

With this operation, the transmission management system 50 can grasp, when the transmission terminal 10 starts, the start-up state and the automatic operation setting information set for the transmission terminal 10.

Figure 17:
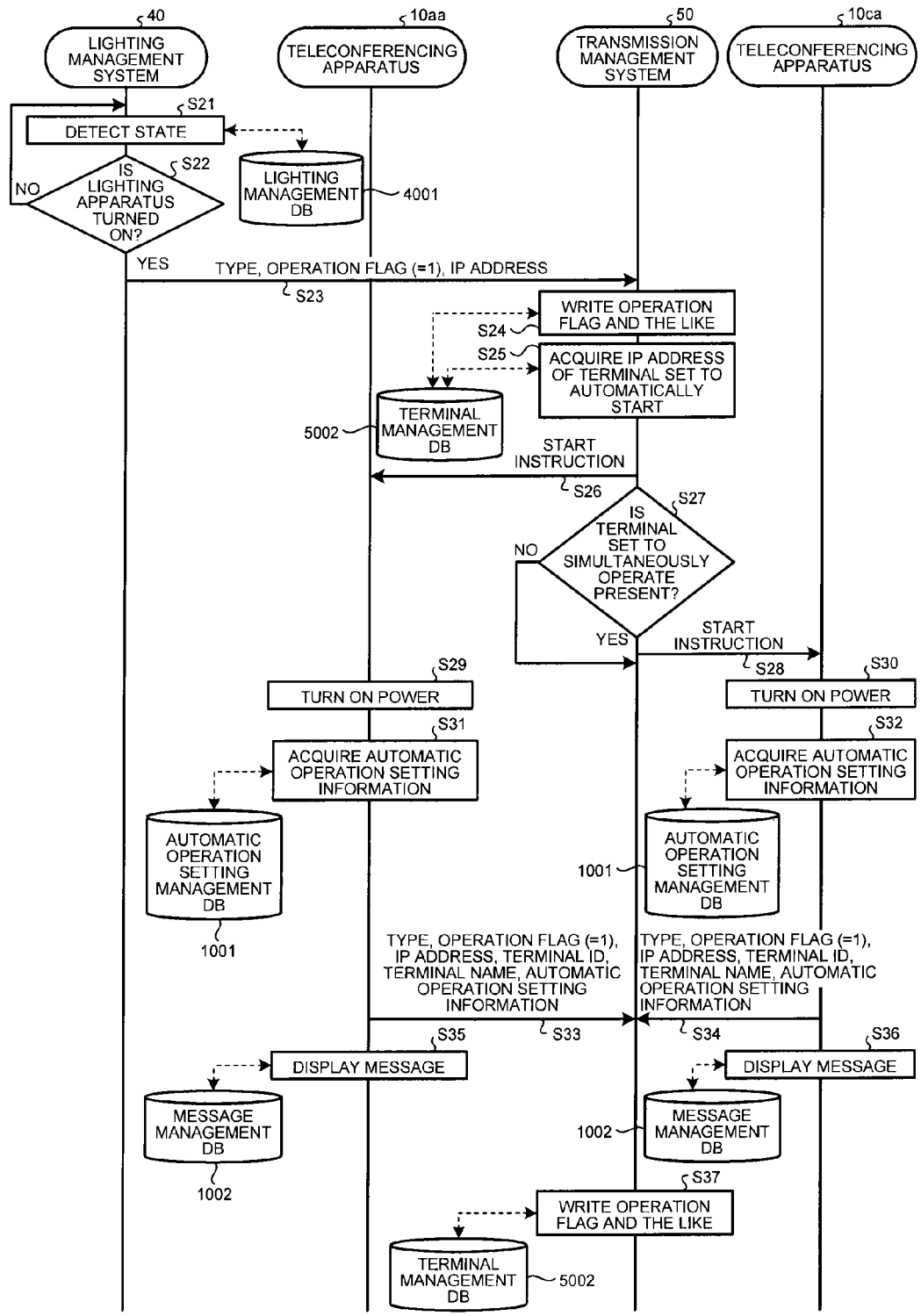
FIG. 17 is a sequence diagram of an example of operations of automatic starting performed by the transmission terminals.

Automatic Start Operation Performed by the Transmission Terminals Set to Simultaneously Operate FIG. 17 is a sequence diagram of an example of operations of automatic starting performed by the transmission terminals. FIG. 18 is a diagram of an example of a message display screen that displays a message when the transmission terminal automatically starts. The following describes the automatic start operation of the transmission terminal 10 and simultaneous execution of the automatic start operation with reference to FIGS. 17 and 18.

Step S21

The state detecting unit 42 of the lighting management system 40 refers to the lighting management table in the lighting management DB 4001 at predetermined time intervals (e.g., every one minute). Thus, the state detecting unit 42 acquires the lighting state flag of the lighting apparatuses (lighting apparatuses 62*a* to 62*d* in FIG. 4) in each area on the floor managed by the lighting management system 40.

Step S22

The state detecting unit 42 performs logical addition on the lighting state flags of respective areas on the managed floor. The state detecting unit 42 detects whether the logical addition turns into "1" from "0", that is, whether at least one of the lighting apparatuses on the floor is turned on from the state where all of them are off. If the state detecting unit 42 detects that at least one of the lighting apparatuses on the floor is turned on from the state where all of them are off (Yes at Step S22), the process proceeds to Step S23. If not (No at Step S22), the process is returned to Step S21.

Step S23

The transmitting and receiving unit 41 of the lighting management system 40 transmits the type of the lighting management system 40, the operation flag (=1), and the IP addresses of the lighting control units (lighting control units 61*a* to 61*d* in FIG. 4) managed by the lighting management system 40 to the transmission management system 50 via the communication network 2. The transmitting and receiving unit 51 of the transmission management system 50 receives the type, the operation flag (=1), and the IP addresses transmitted from the transmitting and receiving unit 41.

Step S24

The storing and reading unit 59 of the transmission management system 50 writes the type, the operation flag (=1), and the IP addresses received by the transmitting and receiving unit 51 in the terminal management table in the terminal management DB 5002. Specifically, the storing and reading unit 59 uses the received IP addresses as a search key to determine whether a record of the IP addresses is present in the terminal management table. If the IP addresses are present, the storing and reading unit 59 updates the corresponding record with the type and the operation flag. By contrast, if the received IP addresses are not present in the terminal management table, the storing and reading unit 59 creates a new record. The storing and reading unit 59 acquires the value of the floor by referring to a record having the administrator setting flag of "1" and including the received IP addresses. The storing and reading unit 59 then writes the floor, the type, the operation flag, and the IP addresses in the record.

Step S25

The state management unit 53 of the transmission management system 50 acquires the IP address of a transmission terminal 10 having the same floor number as that of the lighting management system 40 the operation flag (=1) of which is stored by the storing and reading unit 59, having the operation flag of "0", and having the automatic start setting of "1" from the terminal management table in the terminal management DB 5002. In this example, the state management unit 53 acquires the IP address of the teleconferencing apparatus 10*aa* (first transmission terminal) serving as the transmission terminal 10.

While the state management unit 53 acquires the IP address of a non-operating transmission terminal 10 so as to cause the transmitting and receiving unit 51, which will be described later, to transmit a start instruction to the non-operating transmission terminal 10 of the transmission terminals 10 on the floor managed by the lighting management system 40, the embodiment is not limited thereto. In other words, in a case where the start instruction can be transmitted to an operating transmission terminal 10 without any trouble, the state management unit 53 may also acquire the IP address of the operating transmission terminal 10.

Step S26

The transmitting and receiving unit 51 transmits a start instruction (first start instruction) to the teleconferencing apparatus 10*aa* out of the transmission terminals 10 on the floor managed by the lighting management system 40 via the communication network 2. The teleconferencing apparatus 10*aa* corresponds to the transmission terminal 10 having the automatic start setting of "1" and having the IP address acquired by the state management unit 53. The transmitting and receiving unit 11 of the teleconferencing apparatus 10*aa* receives the start instruction transmitted from the transmitting and receiving unit 51.

Step S27

The simultaneous operation management unit 54 of the transmission management system 50 acquires the terminal ID of the transmission terminal 10 set to operate simultaneously with the transmission terminal 10 (teleconferencing apparatus 10*aa*) having the IP address acquired by the state management unit 53 from the destination list management table in the terminal management DB 5002. If the simultaneous operation management unit 54 acquires the terminal ID of the transmission terminal 10 set to operate simultaneously with the teleconferencing apparatus 10*aa* (Yes at Step S27), the simultaneous operation management unit 54 acquires the IP address of the transmission terminal 10 associated with the acquired terminal ID from the terminal management table in the terminal management DB 5002. In this example, the teleconferencing apparatus 10*ca* is set to operate simultaneously with the teleconferencing apparatus 10*aa*. Thus, the simultaneous operation management unit 54 acquires the terminal ID of the teleconferencing apparatus 10*ca* (second transmission terminal) serving as the transmission terminal 10 from the destination list management table and the IP address of the teleconferencing apparatus 10*ca* from the terminal management table. The process proceeds to Step S28.

By contrast, if the simultaneous operation management unit 54 acquires no terminal ID of the transmission terminal 10 set to operate simultaneously with the teleconferencing apparatus 10*aa* (No at Step S27), the processing at Step S28 is skipped. In other words, the processing at Steps S30, S32, S34, and S36, which are the operations of the teleconferencing apparatus 10*ca* and will be described later, are not performed.

Step S28

The transmitting and receiving unit 51 transmits a start instruction (second start instruction) to the teleconferencing apparatus 10*ca* having the IP address acquired by the simultaneous operation management unit 54 via the communication network 2. The transmitting and receiving unit 11 of the teleconferencing apparatus 10*ca* receives the start instruction transmitted from the transmitting and receiving unit 51.

Step S29

If the transmitting and receiving unit 11 receives the start instruction, the power management unit 16 (first power management unit) of the teleconferencing apparatus 10*aa* turns on the power of the teleconferencing apparatus 10*aa*, thereby starting the teleconferencing apparatus 10*aa*.

Step S30

If the transmitting and receiving unit 11 receives the start instruction, the power management unit 16 (second power management unit) of the teleconferencing apparatus 10*ca* turns on the power of the teleconferencing apparatus 10*ca*, thereby starting the teleconferencing apparatus 10*ca*.

Step S31

The power setting unit 15 of the teleconferencing apparatus 10*aa* acquires the automatic operation setting information currently set from the automatic operation setting management table in the automatic operation setting management DB 1001.

Step S32

The power setting unit 15 of the teleconferencing apparatus 10*ca* acquires the automatic operation setting information currently set from the automatic operation setting management table in the automatic operation setting management DB 1001.

Step S33

The transmitting and receiving unit 11 of the teleconferencing apparatus 10*aa* transmits the information on the teleconferencing apparatus 10*aa* illustrated in FIG. 16, including the IP address, the type, the operation flag (=1), the terminal ID, the terminal name, and the automatic operation setting information acquired by the power setting unit 15 to the transmission management system 50 via the communication network 2. As illustrated in FIG. 16, the transmitted automatic operation setting information is automatic start setting and automatic shutdown setting managed in the automatic operation setting management table. The transmitting and receiving unit 51 of the transmission management system 50 receives the IP address, the type, the operation flag (=1), the terminal ID, the terminal name, and the automatic operation setting information transmitted from the transmitting and receiving unit 11.

Step S34

The transmitting and receiving unit 11 of the teleconferencing apparatus 10*ca* transmits the information on the teleconferencing apparatus 10*ca* illustrated in FIG. 16, including the IP address, the type, the operation flag (=1), the terminal ID, the terminal name, and the automatic operation setting information acquired by the power setting unit 15 to the transmission management system 50 via the communication network 2. As illustrated in FIG. 16, the transmitted automatic operation setting information is automatic start setting and automatic shutdown setting managed in the automatic operation setting management table. The transmitting and receiving unit 51 of the transmission management system 50 receives the IP address, the type, the operation flag (=1), the terminal ID, the terminal name, and the automatic operation setting information transmitted from the transmitting and receiving unit 11.

Step S35

If the transmitting and receiving unit 11 receives the start instruction, the display control unit 13 of the teleconferencing apparatus 10*aa* acquires a message (e.g., the message with the ID number of 2 illustrated in FIG. 7) for automatic start-up from the message management table in the message management DB 1002. The display control unit 13 then displays a message display screen 2011 that displays the message on the display 120 as illustrated in FIG. 18.

Step S36

If the transmitting and receiving unit 11 receives the start instruction, the display control unit 13 of the teleconferencing apparatus 10*ca* acquires a message (e.g., the message with the ID number of 2 illustrated in FIG. 7) for automatic start-up from the message management table in the message management DB 1002. The display control unit 13 then displays the message display screen 2011 that displays the message on the display 120 as illustrated in FIG. 18.

Step S37

The storing and reading unit 59 of the transmission management system 50 writes the IP addresses, the types, the operation flags (=1), the terminal IDs, the terminal names, and the automatic operation setting information of the respective teleconferencing apparatuses 10*aa* and 10*ca* received by the transmitting and receiving unit 51 in the terminal management table in the terminal management DB 5002. Specifically, the storing and reading unit 59 uses the received IP addresses of the respective teleconferencing apparatuses 10*aa* and 10*ca* as a search key to determine whether records of the respective IP addresses are present in the terminal management table. If the IP addresses are present, the storing and reading unit 59 updates the corresponding records with the types, the operation flags, and the automatic operation setting information. By contrast, if the received IP address of the teleconferencing apparatus 10*aa* or the teleconferencing apparatus 10*ca* is not present in the terminal management table, the storing and reading unit 59 creates a new record. The storing and reading unit 59 acquires the value of the floor by referring to a record having the administrator setting flag of "1" and including the received IP address. The storing and reading unit 59 then writes the IP address, the floor, the type, the operation flag, the terminal ID, the terminal name, and the automatic operation setting information in the record.

Thus, the automatic start operation is performed on the transmission terminals 10 set to simultaneously operate (teleconferencing apparatuses 10*aa* and 10*ca* in the example in FIG. 17).

As described above, the transmission management system 50 grasps the lighting state of the lighting apparatuses on each floor. When at least one of the lighting apparatuses in each area on the floor is turned on, the transmission management system 50 transmits a start instruction to the transmission terminal 10 for which the automatic start setting is valid, thereby causing the transmission terminal 10 to automatically start. This mechanism can save the user from manually turning on the powers of the transmission terminals 10 one by one, thereby reducing the operational burden of the user and improving the convenience.

Let us assume that the automatic start setting can be made valid or invalid for the transmission terminals 10 and that there is a transmission terminal 10 for which the automatic start setting is invalid when at least one of the lighting apparatuses in each area on the floor is turned on. In this case, the transmission terminal 10 receives no start instruction from the transmission management system 50 and performs no start processing. This mechanism can prevent a transmission terminal 10 or the like not desired to be turned on except in the case of emergency when any one of the lighting apparatuses is turned on from automatically performing the start processing, thereby improving the convenience.

When any one of the lighting apparatuses is turned on in each area on the floor provided with a first transmission terminal 10 for which the automatic start setting is valid out of a plurality of transmission terminals 10 set to simultaneously operate, the transmission management system 50 causes the first transmission terminal 10 to automatically start and causes a second transmission terminal 10 set to operate simultaneously with the first transmission terminal 10 to automatically start. This mechanism, for example, enables the user to check the state of a room provided with a second teleconferencing apparatus serving as the second transmission terminal 10 caused to automatically start by the simultaneous operation setting on the display 120 of a first teleconferencing apparatus serving as the first transmission terminal 10 caused to automatically start. This can improve the convenience for the user of the transmission terminal 10. In this case, by checking the state of the room provided with the second teleconferencing apparatus serving as the second transmission terminal 10, for example, the user can grasp whether the room is available from a distant place.

Figure 19:
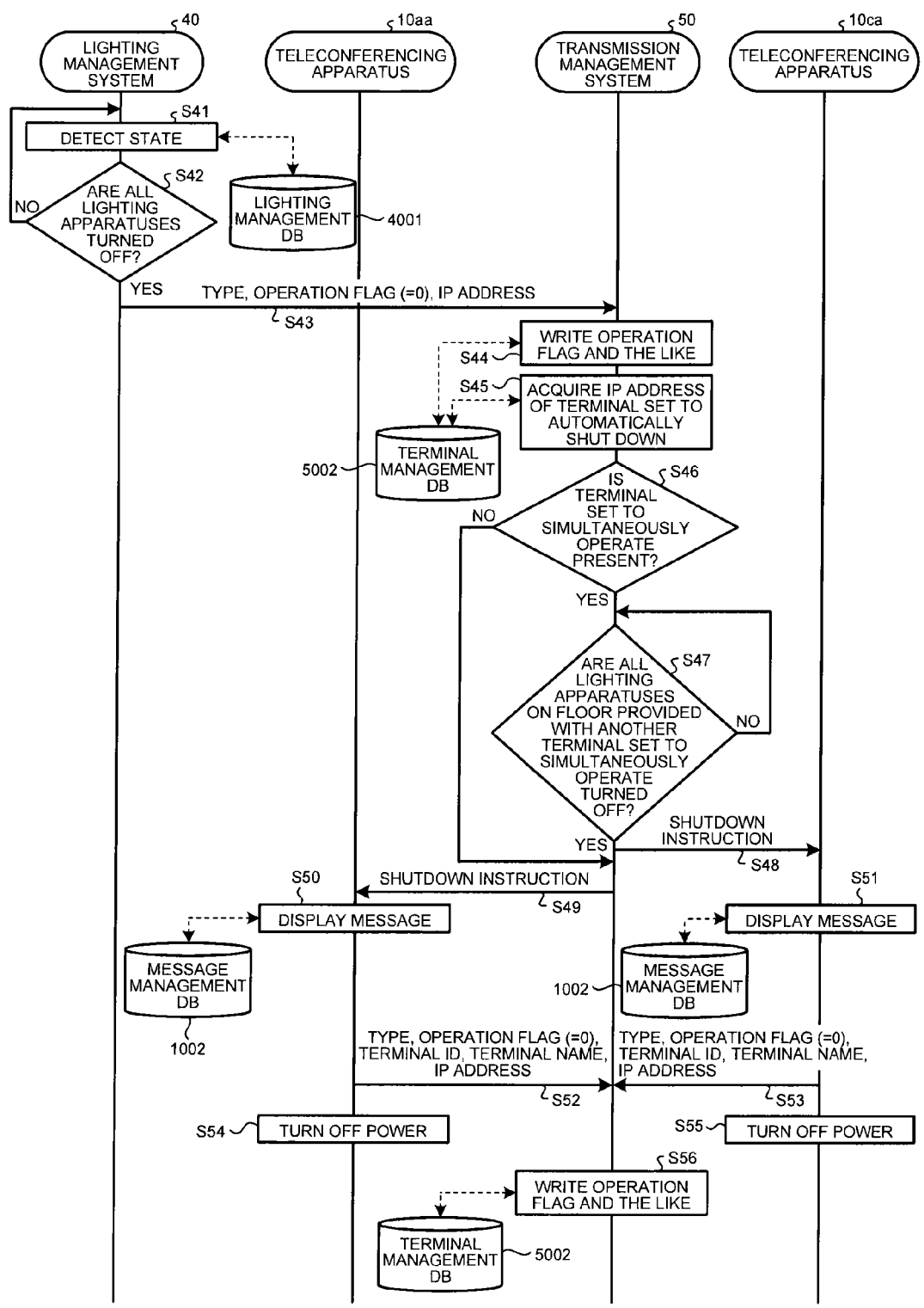
FIG. 19 is a sequence diagram of an example of operations of automatically shutting down performed by the transmission terminals.

Automatic Shutdown Operation Performed by the Transmission Terminals Set to Simultaneously Operate FIG. 19 is a sequence diagram of an example of operations of automatically shutting down performed by the transmission terminals. FIG. 20 is a diagram of an example of the message display screen that displays a message when the transmission terminal automatically shuts down. The following describes the automatic shutdown operation of the transmission terminal 10 and simultaneous execution of the automatic shutdown operation with reference to FIGS. 19 and 20.

Step S41

The state detecting unit 42 of the lighting management system 40 refers to the lighting management table in the lighting management DB 4001 at predetermined time intervals (e.g., every one minute). Thus, the state detecting unit 42 acquires the lighting state flag of the lighting apparatuses (lighting apparatuses 62a to 62d in FIG. 4) in each area on the floor managed by the lighting management system 40.

Step S42

The state detecting unit 42 performs logical addition on the lighting state flags of respective areas on the managed floor. The state detecting unit 42 detects whether the logical addition turns into "0" from "1", that is, whether all the lighting apparatuses on the floor are turned off from the state where any one of them is on. If the state detecting unit 42 detects that all the lighting apparatuses on the floor are turned off from the state where any one of them is on (Yes at Step S42), the process proceeds to Step S43. If not (No at Step S42), the process is returned to Step S41.

Step S43

The transmitting and receiving unit 41 of the lighting management system 40 transmits the type of the lighting management system 40, the operation flag (=0), and the IP addresses of the lighting control units (lighting control units 61a to 61d in FIG. 4) managed by the lighting management system 40 to the transmission management system 50 via the communication network 2. The transmitting and receiving unit 51 of the transmission management system 50 receives the type, the operation flag (=0), and the IP addresses transmitted from the transmitting and receiving unit 41.

Step S44

The storing and reading unit 59 of the transmission management system 50 writes the type, the operation flag (=0), and the IP addresses received by the transmitting and receiving unit 51 in the terminal management table in the terminal management DB 5002. Specifically, the storing and reading unit 59 uses the received IP addresses as a search key to determine whether a record of the IP addresses is present in the terminal management table. If the IP addresses are present, the storing and reading unit 59 updates the corresponding record with the type and the operation flag. By contrast, if the received IP addresses are not present in the terminal management table, the storing and reading unit 59 creates a new record. The storing and reading unit 59 acquires the value of the floor by referring to a record having the administrator setting flag of "1" and including the received IP addresses. The storing and reading unit 59 then writes the floor, the type, the operation flag, and the IP addresses in the record.

Step S45

The state management unit 53 of the transmission management system 50 acquires the IP address of a transmission terminal 10 having the same floor number as that of the lighting management system 40 the operation flag (=0) of which is stored by the storing and reading unit 59, having the operation flag of "1", and having the automatic shutdown setting of "1" from the terminal management table in the terminal management DB 5002. In this example, the state management unit 53 acquires the IP address of the teleconferencing apparatus 10aa (third transmission terminal) serving as the transmission terminal 10.

While the state management unit 53 acquires the IP address of an operating transmission terminal 10 so as to cause the transmitting and receiving unit 51, which will be described later, to transmit a shutdown instruction to the operating transmission terminal 10 of the transmission terminals 10 on the floor managed by the lighting management system 40, the embodiment is not limited thereto. In other words, in a case where the shutdown instruction can be transmitted to a non-operating transmission terminal 10 without any trouble, the state management unit 53 may also acquire the IP address of the non-operating transmission terminal 10.

Step S46

The simultaneous operation management unit 54 of the transmission management system 50 acquires the terminal ID of the transmission terminal 10 set to operate simultaneously with the transmission terminal 10 (teleconferencing apparatus 10aa) having the IP address acquired by the state management unit 53 from the destination list management table in the terminal management DB 5002. If the simultaneous operation management unit 54 acquires the terminal ID of the transmission terminal 10 set to operate simultaneously with the teleconferencing apparatus 10aa (Yes at Step S46), the simultaneous operation management unit 54 acquires the IP address of the transmission terminal 10 associated with the acquired terminal ID from the terminal management table in the terminal management DB 5002. In this example, the teleconferencing apparatus 10*ca* is set to operate simultaneously with the teleconferencing apparatus 10*aa*. Thus, the simultaneous operation management unit 54 acquires the terminal ID of the teleconferencing apparatus 10*ca* (fourth transmission terminal) serving as the transmission terminal 10 from the destination list management table and the IP address of the teleconferencing apparatus 10*ca* from the terminal management table. The process proceeds to Step S47.

By contrast, if the simultaneous operation management unit 54 acquires no terminal ID of the transmission terminal 10 set to operate simultaneously with the teleconferencing apparatus 10*aa* (No at Step S46), the processing at Steps S47 and S48 is skipped. In other words, the processing at Steps S51, S53, and S55, which are the operations of the teleconferencing apparatus 10*ca* and will be described later, are not performed.

Step S47

The state detecting unit 42 performs logical addition on the lighting state flags of respective areas on the floor provided with the teleconferencing apparatus 10*ca*. The state detecting unit 42 detects whether the logical addition turns into "0" from "1", that is, whether all the lighting apparatuses on the floor are turned off from the state where any one of them is on. If the state detecting unit 42 detects that all the lighting apparatuses on the floor are turned off from the state where any one of them is on (Yes at Step S47), the process proceeds to Step S48. If not (No at Step S47), the state detecting unit 42 continues the operation for detecting the lighting state.

Step S48

The transmitting and receiving unit 51 transmits a shutdown instruction (second stop instruction) to the teleconferencing apparatus 10*ca* set to operate simultaneously with the teleconferencing apparatus 10*aa* via the communication network 2. The transmitting and receiving unit 11 of the teleconferencing apparatus 10*ca* receives the shutdown instruction transmitted from the transmitting and receiving unit 51.

Step S49

The transmitting and receiving unit 51 transmits a shutdown instruction (first stop instruction) to the teleconferencing apparatus 10*aa* having the automatic shutdown setting of "1" via the communication network 2. The transmitting and receiving unit 11 of the teleconferencing apparatus 10*aa* receives the shutdown instruction transmitted from the transmitting and receiving unit 51.

Step S50

If the transmitting and receiving unit 11 receives the shutdown instruction, the display control unit 13 of the teleconferencing apparatus 10*aa* acquires a message (e.g., the message with the ID number of 0 illustrated in FIG. 7) for automatic shutdown from the message management table in the message management DB 1002. The display control unit 13 then displays a message display screen 2010 that displays the message on the display 120 as illustrated in FIG. 20.

Step S51

If the transmitting and receiving unit 11 receives the shutdown instruction, the display control unit 13 of the teleconferencing apparatus 10*ca* acquires a message (e.g., the message with the ID number of 0 illustrated in FIG. 7) for automatic shutdown from the message management table in the message management DB 1002. The display control unit 13 then displays the message display screen 2010 that displays the message on the display 120 as illustrated in FIG. 20.

Step S52

The transmitting and receiving unit 11 of the teleconferencing apparatus 10*aa* transmits the IP address, the type, the operation flag (=0), the terminal ID, and the terminal name of the teleconferencing apparatus 10*aa* to the transmission management system 50 via the communication network 2. The transmitting and receiving unit 51 of the transmission management system 50 receives the IP address, the type, the operation flag (=0), the terminal ID, and the terminal name transmitted from the transmitting and receiving unit 11.

Step S53

The transmitting and receiving unit 11 of the teleconferencing apparatus 10*ca* transmits the IP address, the type, the operation flag (=0), the terminal ID, and the terminal name of the teleconferencing apparatus 10*ca* to the transmission management system 50 via the communication network 2. The transmitting and receiving unit 51 of the transmission management system 50 receives the IP address, the type, the operation flag (=0), the terminal ID, and the terminal name transmitted from the transmitting and receiving unit 11.

Step S54

If the transmitting and receiving unit 11 transmits the operation flag (=0) and other data, the power management unit 16 (first power management unit) of the teleconferencing apparatus 10*aa* performs shutdown processing on the teleconferencing apparatus 10*aa*, thereby turning off the power of the teleconferencing apparatus 10*aa*.

Step S55

If the transmitting and receiving unit 11 transmits the operation flag (=0) and other data, the power management unit 16 (second power management unit) of the teleconferencing apparatus 10*ca* performs shutdown processing on the teleconferencing apparatus 10*ca*, thereby turning off the power of the teleconferencing apparatus 10*ca*.

Step S56

The storing and reading unit 59 of the transmission management system 50 writes the types, the operation flags (=0), the terminal IDs, the terminal names, and the IP addresses of the respective teleconferencing apparatuses 10*aa* and 10*ca* received by the transmitting and receiving unit 51 in the terminal management table in the terminal management DB 5002. Specifically, the storing and reading unit 59 uses the received IP addresses of the respective teleconferencing apparatuses 10*aa* and 10*ca* as a search key to determine whether records of the respective IP addresses are present in the terminal management table. If the IP addresses are present, the storing and reading unit 59 updates the corresponding records with the types and the operation flags. By contrast, if the received IP address of the teleconferencing apparatus 10*aa* or the teleconferencing apparatus 10*ca* is not present in the terminal management table, the storing and reading unit 59 creates a new record. The storing and reading unit 59 acquires the value of the floor by referring to a record having the administrator setting flag of "1" and including the received IP address. The storing and reading unit 59 then writes the type, the floor, the operation flag, the terminal ID, the terminal name, and the IP address in the record.

Thus, the automatic shutdown operation is performed on the transmission terminals 10 set to simultaneously operate (teleconferencing apparatuses 10*aa* and 10*ca* in the example in FIG. 19).

As described above, the transmission management system 50 grasps the lighting state of the lighting apparatuses on each floor. When all the lighting apparatuses in each area on the floor are turned off, the transmission management system 50 transmits a shutdown instruction to one or more of transmission terminals 10 placed on the floor, thereby causing the transmission terminals 10 to automatically shut down. This mechanism can reduce unnecessary cost including communication charges and electricity rates, unnecessary power consumption, and unnecessary traffic in the communication network generated by an unused transmission terminal 10 being operating.

Let us assume that the automatic shutdown setting can be made valid or invalid for the transmission terminals 10 and that there is a transmission terminal 10 for which the automatic shutdown setting is invalid when all the lighting apparatuses in each area on the floor are turned off. In this case, the transmission terminal 10 receives no shutdown instruction from the transmission management system 50 and performs no shutdown processing. This mechanism can prevent a transmission terminal 10 or the like not desired to be turned off when all the lighting apparatuses are turned off from automatically performing the shutdown processing, thereby improving the convenience.

When all the lighting apparatuses are turned off in each area on the floor provided with a plurality of transmission terminals 10 set to simultaneously operate, the transmission management system 50 causes a first transmission terminal 10 for which the automatic shutdown setting is valid to automatically shut down and causes a second transmission terminal 10 set to operate simultaneously with the first transmission terminal 10 to automatically shut down. This mechanism, for example, can save the user from checking the state of the rooms provided with the respective transmission terminals 10 when all the lighting apparatuses are turned off on the floor provided with the transmission terminals 10 set to simultaneously operate. Furthermore, this mechanism can cause the transmission terminals 10 to automatically shut down, thereby improving the convenience for the user of the transmission terminal 10.

At least one of the transmitting and receiving unit 11, the display control unit 13, the authentication unit 14, the power setting unit 15, and the power management unit 16 of the transmission terminal 10, the transmitting and receiving unit 41, the state detecting unit 42, and the authentication unit 43 of the lighting management system 40, the transmitting and receiving unit 51, the authentication unit 52, the state management unit 53, and the simultaneous operation management unit 54 of the transmission management system 50, and the transmitting and receiving unit 81, the display control unit 83, and the login requesting unit 84 of the setting management system 80 may be provided by execution of a computer program, which is software. Alternatively, at least one of them may be provided as a hardware circuit, such as an application specific integrated circuit (ASIC) and a field-programmable gate array (FPGA).

In a case where at least one of the transmitting and receiving unit 11, the display control unit 13, the authentication unit 14, the power setting unit 15, and the power management unit 16 of the transmission terminal 10, the transmitting and receiving unit 41, the state detecting unit 42, and the authentication unit 43 of the lighting management system 40, the transmitting and receiving unit 51, the authentication unit 52, the state management unit 53, and the simultaneous operation management unit 54 of the transmission management system 50, and the transmitting and receiving unit 81, the display control unit 83, and the login requesting unit 84 of the setting management system 80 is provided by execution of a computer program, the computer program is embedded and provided in a ROM, for example. The computer program executed by the transmission system 1 according to the present embodiment may be recorded and provided in a computer-readable recording medium, such as a CD-ROM, a flexible disk (FD), a CD-R, and a DVD, as an installable or executable file. The computer program executed by the transmission system 1 according to the present embodiment may be stored in a computer connected to a network, such as the Internet, and provided by being downloaded via the network. Furthermore, the computer program executed by the transmission system 1 according to the present embodiment may be provided or distributed via a network, such as the Internet. The computer program executed by the transmission system 1 according to the present embodiment has a module configuration including at least one of the display control unit 13, the authentication unit 14, the power setting unit 15, and the power management unit 16 of the transmission terminal 10, the state detecting unit 42 and the authentication unit 43 of the lighting management system 40, the authentication unit 52, the state management unit 53, and the simultaneous operation management unit 54 of the transmission management system 50, and the display control unit 83 and the login requesting unit 84 of the setting management system 80. In actual hardware, the CPU reads and executes the computer program from the ROM to load and generate each unit on the main memory.

While the terminal management table illustrated in FIG. 9 manages the apparatuses including the transmission terminal 10 based on the information of "floor" indicating which floor the apparatuses are placed on, the embodiment is not limited thereto. In other words, the terminal management table may manage the apparatuses based not only on which floor the apparatuses are placed on but also on which area on the floor the apparatuses are placed in. In this case, the lighting management system 40 may detect whether all the lighting apparatuses are turned off or at least one of them is turned on not in units of a floor but in units of an area on a floor. This configuration makes it possible to perform the automatic start processing and the automatic shutdown processing of the transmission terminal 10 in units of an area finer than a floor, thereby improving the convenience. By contrast, the lighting management system 40 may manage the lighting state of the lighting apparatuses not on each floor but on a plurality of floors collectively. In this case, the operations performed in the automatic start processing and the automatic shutdown processing are similar to those described above.

While the lighting management system 40 transmits the operation flag (=0) to the transmission management system 50 when all the lighting apparatuses on the managed floor (or area) are turned off from the state where any one of them is on, the embodiment is not limited thereto. In other words, the lighting management system 40 may transmit the operation flag (=0) to the transmission management system 50 when a predetermined number or more of lighting apparatuses on the floor (or area) managed by the lighting management system 40 are turned off. This configuration can prevent the following situation: because only one lighting apparatus is on as a result of the user's forgetting to turn it off, for example, no shutdown instruction is transmitted from the transmission management system 50, thereby causing the transmission terminal 10 placed on the floor (or area) managed by the lighting management system 40 to operate. By contrast, while the lighting management system 40 transmits the operation flag (=1) to the transmission management system 50 when at least one of the lighting apparatuses on the managed floor (or area) is turned on, the embodiment is not limited thereto. In other words, the lighting management system 40 may transmit the operation flag (=1) to the transmission management system 50 when a predetermined number or more of lighting apparatuses on the floor (or area) managed by the lighting management system 40 are turned on. This configuration can prevent the following situation: when all the lighting apparatuses on the floor (or area) are off, for example, an employee comes to pick up something he/she forgot and turns on one lighting apparatus, thereby causing the transmission terminal 10 placed on the floor (or area) managed by the lighting management system 40 to unnecessarily start.

The configuration of the functional units of the transmission terminal 10, the lighting management system 40, the transmission management system 50, and the setting management system 80 illustrated in FIG. 4 is given by way of example only and is not limited thereto. The configuration of the functional units may be any configuration as long as it can substantially provide the functions of the functional units.

Each of the lighting management system 40, the transmission management system 50, and the setting management system 80 is not necessarily configured as one apparatus as illustrated in FIGS. 3 and 4 and may be configured as a plurality of apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A transmission system including a plurality of transmission terminals, the transmission system comprising:
   a state detecting unit that detects whether a lighting apparatus in a specific area is turned on from an off-state;
   a first identifying unit that identifies a first transmission terminal serving as one of the transmission terminals belonging to the area when the state detecting unit detects that the lighting apparatus is turned on from an off-state;
   a second identifying unit that identifies a second transmission terminal serving as one or more of the transmission terminals set to perform a simultaneous operation with the first transmission terminal;
   a transmitting unit that transmits a first start instruction to the first transmission terminal identified by the first identifying unit and transmits a second start instruction to the second transmission terminal identified by the second identifying unit;
   a first power management unit that performs start processing on the first transmission terminal in accordance with the first start instruction; and
   a second power management unit that performs start processing on the second transmission terminal in accordance with the second start instruction.

2. The transmission system according to claim 1, wherein the state detecting unit further detects whether the lighting apparatus in the area is turned off from the on-state,
   the first identifying unit identifies a third transmission terminal serving as one of the transmission terminals belonging to the area when the state detecting unit detects that the lighting apparatus is turned off from the on-state,
   the second identifying unit identifies a fourth transmission terminal serving as one or more of the transmission terminals set to perform a simultaneous operation with the third transmission terminal,
   the transmitting unit transmits a first stop instruction to the third transmission terminal identified by the first identifying unit and transmits a second stop instruction to the fourth transmission terminal identified by the second identifying unit,
   the first power management unit performs stop processing on the third transmission terminal in accordance with the first stop instruction, and
   the second power management unit performs stop processing on the fourth transmission terminal in accordance with the second stop instruction.

3. The transmission system according to claim 2, wherein the first identifying unit identifies the third transmission terminal belonging to the area and being operating when the state detecting unit detects that all lighting apparatuses in the area are turned off from a state where at least one of the lighting apparatuses is on.

4. The transmission system according to claim 2, further comprising a second setting unit that sets whether to transmit the first start instruction or the first stop instruction from the transmitting unit to the transmission terminal.

5. The transmission system according to claim 2, wherein the transmitting unit transmits a shutdown instruction as the first stop instruction or the second stop instruction, and
   the first power management unit or the second power management unit performs shutdown processing as the stop processing when the shutdown instruction is received.

6. The transmission system according to claim 1, wherein the first identifying unit identifies the first transmission terminal belonging to the area and not operating when the state detecting unit detects that at least one of lighting apparatuses in the area is turned on from a state where all the lighting apparatuses are off.

7. The transmission system according to claim 1, further comprising a first setting unit that sets the simultaneous operation on a specific transmission terminal with one or more of the transmission terminals different from the specific transmission terminal.

8. The transmission system according to claim 1, further comprising a third setting unit that sets the specific area.

9. A transmission management system comprising:
a first identifying unit that identifies, when a lighting management system detects that a lighting apparatus in an area managed by the lighting management system is turned on from an off-state, a first transmission terminal serving as a transmission terminal belonging to the area;
a second identifying unit that identifies a second transmission terminal serving as one or more of transmission terminals set to perform a simultaneous operation with the first transmission terminal; and
a transmitting unit that transmits a first start instruction for performing start processing to the first transmission terminal identified by the first identifying unit and transmits a second start instruction for performing start processing to the second transmission terminal identified by the second identifying unit.

10. A transmission method performed by a transmission system including a plurality of transmission terminals, the transmission method comprising:
a state-detecting that detects whether a lighting apparatus in a specific area is turned on from an off-state;
a first-identifying that identifies a first transmission terminal serving as one of the transmission terminals belonging to the area when it is detected that the lighting apparatus is turned on from the off-state;
a second-identifying that identifies a second transmission terminal serving as one or more of the transmission terminals set to perform a simultaneous operation with the first transmission terminal;
a transmitting that transmits a first start instruction to the identified first transmission terminal and transmits a second start instruction to the identified second transmission terminal;
a first-performing that performs start processing on the first transmission terminal in accordance with the first start instruction; and
a second-performing that performs start processing on the second transmission terminal in accordance with the second start instruction.

11. The transmission method according to claim 10, wherein
the state-detecting further includes detecting whether the lighting apparatus in the area is turned off from the on-state,
the first-identifying includes identifying a third transmission terminal serving as one of the transmission terminals belonging to the area when it is detected, at the state-detecting, that the lighting apparatus is turned off from the on-state,
the second-identifying includes identifying a fourth transmission terminal serving as one or more of the transmission terminals set to perform a simultaneous operation with the third transmission terminal,
the transmitting includes transmitting a first stop instruction to the third transmission terminal identified at the first-identifying and transmitting a second stop instruction to the fourth transmission terminal identified at the second-identifying,
the first-performing includes performing stop processing on the third transmission terminal in accordance with the first stop instruction, and
the second-performing includes performing stop processing on the fourth transmission terminal in accordance with the second stop instruction.

12. The transmission method according to claim 11, wherein
the first-identifying includes identifying the third transmission terminal belonging to the area and being operating when it is detected, at the state-detecting, that all lighting apparatuses in the area are turned off from a state where at least one of the lighting apparatuses is on.

13. The transmission method according to claim 11, further comprising a second-setting that sets whether to transmit the first start instruction or the first stop instruction of the transmitting to the transmission terminal.

14. The transmission method according to claim 11, wherein
the transmitting includes transmitting a shutdown instruction as the first stop instruction or the second stop instruction, and
the first-performing or the second-performing includes performing shutdown processing as the stop processing when the shutdown instruction is received.

15. The transmission method according to claim 10, wherein
the first-identifying includes identifying the first transmission terminal belonging to the area and not operating when it is detected, at the state-detecting, that at least one of lighting apparatuses in the area is turned on from a state where all the lighting apparatuses are off.

16. The transmission method according to claim 10, further comprising a first-setting that sets the simultaneous operation on a specific transmission terminal with one or more of the transmission terminals different from the specific transmission terminal.

17. The transmission method according to claim 10, further comprising a third-setting that sets the specific area.

* * * * *